(12) United States Patent
Greenberg et al.

(10) Patent No.: US 6,707,811 B2
(45) Date of Patent: Mar. 16, 2004

(54) INTERNET TELEPHONY FOR ECOMMERCE

(75) Inventors: Jeffrey Douglas Greenberg, Fairfax, VA (US); Joseph Siegrist, Silver Spring, MD (US); Amen Zwa, Owings Mills, MD (US)

(73) Assignee: eStara, Inc., Reston, VA (US)

( * ) Notice: Subject to any disclaimer, the term of this patent is extended or adjusted under 35 U.S.C. 154(b) by 155 days.

(21) Appl. No.: 09/771,993

(22) Filed: Jan. 30, 2001

(65) Prior Publication Data

US 2001/0038624 A1 Nov. 8, 2001

Related U.S. Application Data

(63) Continuation-in-part of application No. 09/637,805, filed on Aug. 11, 2000, which is a continuation-in-part of application No. 09/272,139, filed on Mar. 19, 1999.

(51) Int. Cl.[7] ............................................... H04L 12/66
(52) U.S. Cl. ..................................................... 370/352
(58) Field of Search ............................. 370/352, 353, 370/354, 355, 356, 401, 402, 403, 404, 405, 465, 466; 379/88.17, 93.01, 93.09, 219, 220.01

(56) References Cited

U.S. PATENT DOCUMENTS

| | | |
|---|---|---|
| 5,421,009 A | 5/1995 | Platt |
| 5,604,737 A | 2/1997 | Iwami et al. |
| 5,608,786 A | 3/1997 | Gordon |
| 5,742,596 A | 4/1998 | Baratz et al. |
| 5,751,706 A | 5/1998 | Land et al. |
| 5,764,756 A | 6/1998 | Onweller |
| 5,786,770 A | 7/1998 | Thompson |
| 5,790,538 A | 8/1998 | Sugar |
| 5,835,713 A | 11/1998 | FitzPatrick et al. |

(List continued on next page.)

FOREIGN PATENT DOCUMENTS

EP   0843 454   5/1998

*Primary Examiner*—Kwang Bin Yao
(74) *Attorney, Agent, or Firm*—Piper Rudnick LLP; Steven B. Kelber

(57) ABSTRACT

The universal Internet based telephony system is implemented as a process that is accessible via an Internet web page and executes on the web server that hosts the web page and/or a back-end Internet telephony server which is accessed and controlled by the web server. The customer accesses the universal Internet based telephony system via any existing Java Enabled Internet Browser software resident on the customer's personal computer, either as an adjunct process thereon, or as a dedicated Internet telephony process. When a customer accesses the Internet web page and clicks on the universal Internet based telephony system icon, the web server on which the web page resides executes the resident universal Internet based telephony system hyperlink script and transfers a newly opened browser session to the universal Internet based telephony system web site. The web server uploads an applet to the customer's personal computer to run on the client machine without disturbing the customer's existing web page access, by opening up a separate window on the customer's personal computer for the universal Internet based telephony system, to be seen and operated by the user. The universal Internet based telephony system web site then implements the Internet telephony communication connection between the customer's personal computer and the designated destination.

37 Claims, 17 Drawing Sheets

U.S. PATENT DOCUMENTS

| | | |
|---|---|---|
| 5,838,665 A | 11/1998 | Kahn et al. |
| 5,845,077 A | 12/1998 | Fawcett |
| 5,850,433 A * | 12/1998 | Rondeau .................... 379/201 |
| 5,867,494 A | 2/1999 | Krishnaswamy et al. |
| 5,867,495 A | 2/1999 | Elliott et al. |
| 5,870,547 A | 2/1999 | Pommier et al. |
| 5,870,610 A | 2/1999 | Beyda |
| 5,875,296 A | 2/1999 | Shi et al. |
| 5,883,891 A | 3/1999 | Williams et al. |
| 5,884,032 A * | 3/1999 | Bateman et al. ............ 709/204 |
| 5,889,774 A | 3/1999 | Mirashrafi et al. |
| 5,892,764 A | 4/1999 | Riemann et al. |
| 5,907,547 A | 5/1999 | Foladare et al. |
| 5,909,545 A | 6/1999 | Frese, II et al. |
| 5,919,247 A | 7/1999 | Van Hoff et al. |
| 5,923,844 A | 7/1999 | Pommier et al. |
| 5,941,957 A | 8/1999 | Ingrassia, Jr. et al. |
| 5,944,791 A | 8/1999 | Scherpbier |
| 5,953,322 A | 9/1999 | Kimball |
| 5,953,331 A | 9/1999 | Duncan et al. |
| 5,953,332 A | 9/1999 | Miloslavsky |
| 5,956,334 A | 9/1999 | Chu et al. |
| 5,970,065 A | 10/1999 | Miloslavsky |
| 5,982,767 A | 11/1999 | McIntosh |
| 5,991,394 A | 11/1999 | Dezonno et al. |
| 6,008,804 A | 12/1999 | Pommier et al. |
| 6,011,792 A | 1/2000 | Miloslavsky |
| 6,011,794 A | 1/2000 | Mordowitz et al. |
| 6,026,087 A | 2/2000 | Mirashrafi et al. |
| 6,031,836 A * | 2/2000 | Haserodt .................... 370/389 |
| 6,031,896 A | 2/2000 | Gardell et al. |
| 6,047,314 A | 4/2000 | Pommier et al. |
| 6,049,671 A | 4/2000 | Slivka et al. |
| 6,064,653 A | 5/2000 | Farris |
| 6,064,667 A | 5/2000 | Gisby et al. |
| 6,069,890 A | 5/2000 | White et al. |
| 6,069,891 A | 5/2000 | Mandalia et al. |
| 6,075,783 A | 6/2000 | Voit |
| 6,075,784 A | 6/2000 | Frankel et al. |
| 6,078,581 A | 6/2000 | Shtivelman et al. |
| 6,078,582 A | 6/2000 | Curry et al. |
| 6,094,673 A * | 7/2000 | Dilip et al. ................. 709/202 |
| 6,118,864 A | 9/2000 | Chang et al. |
| 6,122,255 A | 9/2000 | Bartholomew et al. |
| 6,125,113 A | 9/2000 | Farris et al. |
| 6,128,291 A | 10/2000 | Perlman et al. |
| 6,141,341 A | 10/2000 | Jones et al. |
| 6,141,345 A | 10/2000 | Goeddel et al. |
| 6,144,670 A | 11/2000 | Sponaugle et al. |
| 6,275,490 B1 * | 8/2001 | Mattaway et al. .......... 370/352 |
| 6,385,191 B1 * | 5/2002 | Coffman et al. ............ 370/352 |
| 6,411,615 B1 * | 6/2002 | DeGolia et al. ............ 370/352 |

\* cited by examiner

INTERNET TELEPHONY FOR ECOMMERCE

This application is a Continuation-In-Part of application Ser. No. 09/637,805, filed Aug. 11, 2000 which is a Continuation-In-Part of application Ser. No. 09/272,139, filed Mar. 19, 1999, the entirety of which are incorporated herein by reference.

BACKGROUND OF THE INVENTION

1. Field of the Invention

This invention relates to the provision of communications services.

2. Description of Related Art

It is a problem in the field of Internet or IP telephony to provide customers with access to the telephone service without the need to have previously loaded and accurately configured Internet provider-specific telephony software on the customer's accessing personal computer. As used herein, IP telephony refers to a process through which audio information corresponding to spoken words is digitized and transmitted/received from a remote location using the Internet for at least a portion of a route to/from that remote location. The remote location may correspond to a computer or a telephone handset. The PSTN may also be used for some or all of the route to/from the remote location.

Known internet telephony systems require users to install internet telephony software before the users can indicate that a call is desired. This is problematic, especially when a user is viewing a web page and wishes to contact an associated web merchant customer service representative. Known software programs, such as Dialpad, require the user to have pre-installed the Dialpad software, and further require the user to go to the Dialpad website and enter the web merchant's telephone number.

Other systems partially solve these problems. For example, the system described in U.S. Pat. Nos. 6,144,670, 5,889,774, and 6,026,087, describe a system that supports a "Push-to-Talk" button on a merchant's website and that alleviates the need to know or enter a merchant's telephone number. However, while those patents discuss automatically starting internet telephony driver software at the user's computer when the user pushes the "Push-to-Talk" button, they do not address the issue of how the driver software gets installed on the user's computer in the first instance. Additionally, there is no ability to perform a screen pop (as used herein, screen pop refers to causing a display of information about the caller on a display associated with the called party). Still further, those patents mention that it would be desirable to synchronize a user's personal computer display to the display of the called party so that common information may be viewed, but provide no disclosure of how to accomplish this non-trivial result.

Another known system is described in European Patent Office Publication No. 0,843,454A (European Patent App. No. 97308848.7). That system also suffers from many of the drawbacks mentioned above. For example, that system requires an end user, or client computer, to have a preinstalled "internet phone" (presumably a software program). Additionally, while that system does provide a screen pop ability, the mechanism for accomplishing the screen pop is clumsy as the user is required to manually enter some form of identification information. Still further, that system provides no ability to synchronize a user's computer display to a customer service representative computer display. Finally, the system does not provide the call center identifier necessary to place the call to a call center until the user indicates (e.g., by pressing on a button) a desire to place the call. This adds an undesirable delay to the time required to complete the call.

Thus, known Internet telephony systems represent an alternative to standard long distance telephone service, but presents a number of constraints to the end user. The above-identified problems are particularly troublesome in the field of e-commerce applications.

A further problem with existing systems is that they are not adapted to be used in a cellular communication environment, nor are they capable of initiating a directory assistance function and automatic connection to a designated called party.

SUMMARY OF THE INVENTION

The above described problems are solved and a technical advance achieved by the present universal Internet based telephony system which, in a preferred embodiment, is implemented as a process that is accessible via an Internet web page. The invention enables a phone call to be placed from a personal computer without the need for the computer to have been previously configured for Internet telephony. The customer may access the universal Internet based telephony system via any existing Internet browser software resident on the customer's multimedia terminal device, such as a personal computer, either as an adjunct process thereon, or as a dedicated Internet telephony process. This is accomplished by presenting the universal Internet based telephony system to the customer as an accessible service option on any Internet web page, typically in the form of an icon presented thereon. Alternatively, the multimedia customer terminal device can be equipped with an icon which presents the universal Internet based telephony system to the customer as an accessible service option. When a customer, who has accessed the Internet web page either via the multimedia customer terminal device based icon or Internet browser, clicks on the universal Internet based telephony system, icon a universal Internet based telephony system hyperlink script causes a web server to download an applet to the customer's personal computer to run on the client machine without disturbing the customer's existing web page access. This is accomplished by opening up a separate window on the customer's terminal device for the Universal Internet based telephony system, to be seen and operated by the user. The universal Internet based telephony system web site then extends the Internet telephony communication connection from the customer's terminal device to an Internet telephony server/network, forwarding the customer provided data to enable the communication connection to be extended by the Internet telephony server/network to the designated destination. In some embodiments, a customer is prompted for destination information (such as a telephone number if the call is directed toward a telephone receiver on the PSTN) and account information. In other embodiments, service is directed toward a pre-determined destination, such as a "customer service" icon accessible from an e-commerce web page.

Thus, the customer can access Internet telephony service through any hosting web server (where one of the universal Internet based telephony system's affiliate links resides) as the access point, and by using the existing Internet browser software that is resident on any multi-media terminal device. In addition, the universal Internet based telephony system process can be installed on any web server and the routing of the Internet telephony calls from the web server to the designated destination is implemented as a background process via an Internet telephony server/network, in a manner that is transparent to the customer if the customer chooses, as the universal Internet based telephony system page opens a new browser session in a new window which can be minimized during the conversation allowing the user to continue browsing the site from which he/she initiated the universal Internet based telephony system icon while talking to the called party.

Furthermore, in some embodiments the web page can present a plurality of universal Internet based telephony system icons, with the icons representing either general Internet telephony service access or "hard-wired" access to dedicated destinations. Thus, the consumer who accesses a particular web server that hosts a commercial enterprise affiliated with (e.g., has contracted for service with) an Internet telephony service provider can be provided with one "hard-wired" icon (e.g., to a general merchant call center) or a plurality of universal Internet based telephony system icons which are representative of a number of destination choices, such as: customer service, sales, product support, manufacturer's service representative, etc. By selecting one of these dedicated destination icons, the customer activates the universal Internet based telephony system to automatically initiate an Internet telephony call to the identified destination while concurrently maintaining the customer's access to the present web page. The Internet telephony call that is originated from the customer's computer is routed to an Internet telephony host which connects the customer to the universal Internet based telephony system, which completes the call to the called party without the calling party having to enter any identification information of the called party. The system can therefore be used to route customer inquiries to predefined or dynamically defined destinations while the customer concurrently has access to the data provided by the web page. The invention further provides for screen pops at a computer display associated with the called party and synchronization of displays between the called and calling parties (e.g., the customer computer and a computer or terminal associated with the customer service representative).

DETAILED DESCRIPTION OF THE DRAWINGS

Figure 1:
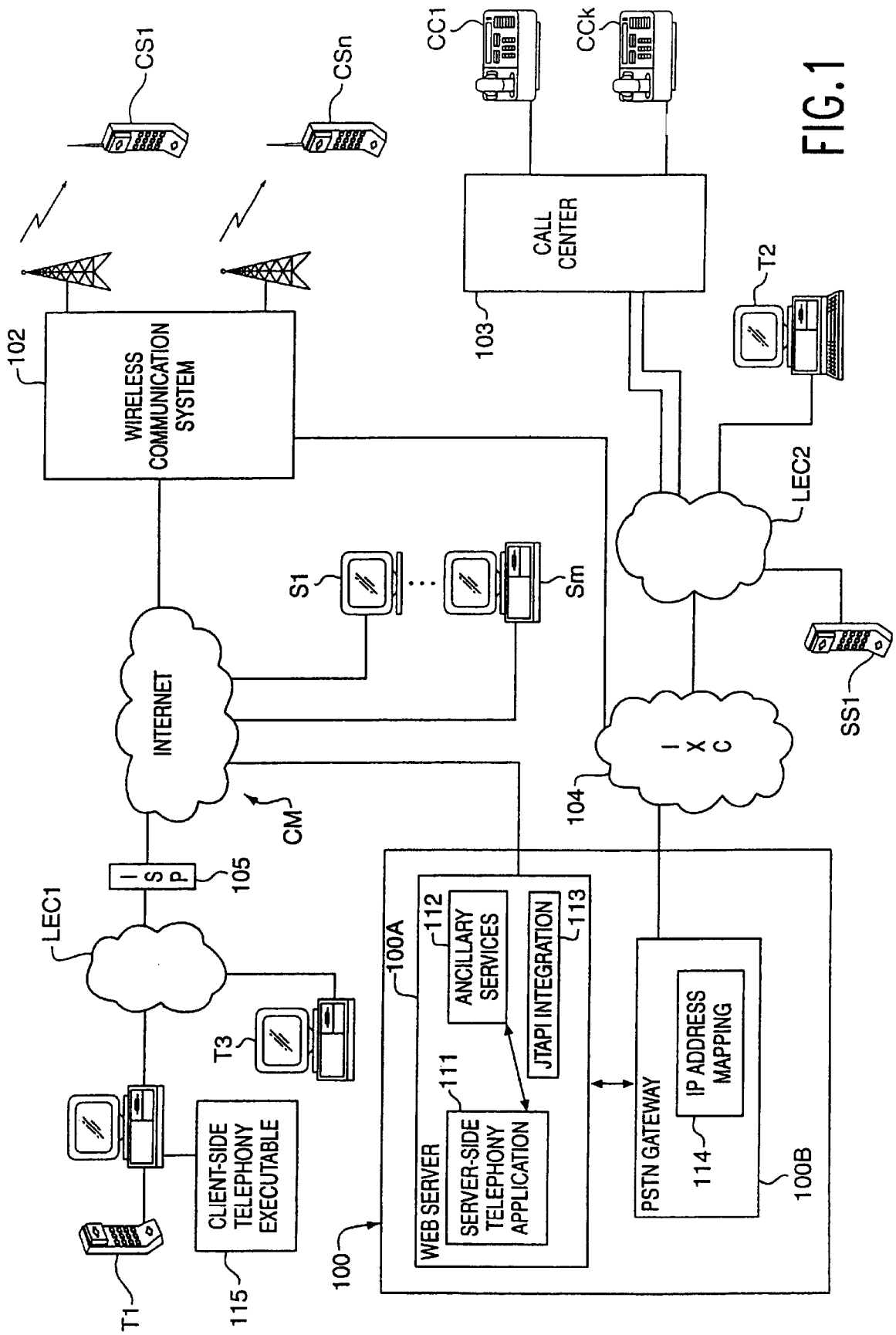
FIG. 1 illustrates in block diagram form the overall architecture of the present universal Internet based telephony system and a typical environment in which it is operational.

FIG. 1 illustrates in block diagram form the overall architecture of the present universal Internet based telephony system 100 and a typical communication network environment in which it is operational. The communication network environment illustrated in FIG. 1 includes communications networks LEC1, LEC2, which comprise a part of the Public Switched Telephone Network (PSTN) that serves a plurality of customer terminal devices T1, T2 (a personal computer, hand held computing device, cellular/wireless communication device, telephone station set or other data interface device, collectively termed "customer terminal devices" T1, T2 herein) and telephone station sets SS1, SS2. The operation of such a communications network is well known and is not described in detail herein. In addition, the Internet is provided to exchange data communications among a plurality of web servers S11–Sm connected thereto. The operation of the Internet is well known and is not described in detail herein. Access to the Internet is provided in well known fashion to customers resident at customer terminal devices T1, T2 via Internet Service Providers 105 which interconnect communications networks LEC1, LEC2 with the Internet. Thus, the customer at customer terminal device T1 accesses the Internet by activating the web browser process that is resident on customer terminal device T1 and initiating a modem connection from customer terminal device T1 through communications network LEC1 to Internet Service Provider 105. The Internet Service Provider 105 enables the customer to access the Internet using the web browser process to gain access to the plurality of web servers S1–Sm (such as universal Internet based telephony system web server 100A) that are interconnected by the Internet. As part of the Internet access, the Internet Service Provider 105 that the customer contacts typically provides a display to the customer terminal device T1, which display is termed a web page, which is downloaded from the Internet Service Provider 105 to the customer terminal device T1.

Universal Internet Based Telephony System Architecture

This universal Internet based telephony system represents a paradigm shift from traditional client-focused application software products used in existing communication systems to a server-focused application service that includes a second layer of enhanced integrated services that provides features and benefits over existing communication service offerings. The suite of integrated applications and the customer's personal data contained in those applications are available to the customer from any browser-enabled terminal device, simply by logging into the web site of the universal Internet based telephony system. This is accomplished by the low level programming of IP telephony protocol stacks, the interactive delivery of these protocol stacks from server to clients, server side applications that replace traditional client applications, a web delivered graphical user interface, and server based customer data structures. The client application is a fraction of the size of existing IP telephony applications and the endpoints of a communication are identified in the service, not by IP address, which traditionally ties a calling party and a called party to a particular computing device. Instead of adding function to each client application, the server is updated and functions are downloaded to the client application as needed. In addition, the customer may be identified by their login ID which is then mapped to the terminal device presently in use by the customer.

The architecture of the universal Internet based telephony system consists of seven logical components which are cooperatively operative on an IP backbone to deliver telephony enabled web page to the customer's terminal device. These components include:

1. Client side terminal device telephony executable process 115
2. Server side telephony application process 111
3. Web server system 100A
4. Ancillary services processes 112
5. JTAPI integration system 113
6. PSTN Gateway system 100B
7. IP address to PSTN (dialed number/calling number) mapping system 114

In operation, presently available IP telephony services require the customer to load an Internet telephony software package on the customer's personal computer in conjunction with establishing a billing account for this telephone service. This process executes on the customer's personal computer and enables the customer to access a specified and dedicated Internet telephony server to thereby obtain access to the Internet telephone service. The need to install Internet provider specific telephony software on the customer's personal computer represents an impediment to customers who access the Internet from various computers, since each personal computer used by the customer must be equipped with the same Internet provider specific telephony software. In addition, the existing dedicated Internet telephony software operates to the exclusion of other Internet access software, thereby failing to coordinate with other Internet accesses that the customer may wish to concurrently execute with the Internet telephony call. Thus, Internet telephony service represents an inexpensive alternative to standard long distance telephone service, but presents a number of constraints to the customer in order to obtain the benefits of low cost communications services.

The client side telephony executable process 115 illustrates the unique clientless nature of the universal Internet based telephony system 100. The present universal Internet based telephony system 100 includes a client side telephony executable process 115 that is interactively delivered to the memory resident Java Virtual Machine running on the customer's terminal device T1 via server side Java application processes 111.

The server side telephony application process 111 refers to application software running on the web server system 100A of the universal Internet based telephony system 100 that delivers the telephony application to the customer's desktop, manages call routing, signaling, set up, tear down, and coordinates the activities of the other components contained in the universal Internet based telephony system 100. The JTAPI integration system 113 consists of a system that is implemented using Java Telephony Applications Programming Interface (JTAPI) and comprises the development environment and tool set that is used by the universal Internet based telephony system 100 to integrate the server side telephony application process 111 with the ancillary services processes 112 that are provided in conjunction with the universal Internet based telephony system 100. The Java Telephony Applications Programming Interface system 113 is a portable, object-oriented application programming interface for Java based computer telephony applications.

Call Origination in the Universal Internet Based Telephony System

Figure 2:
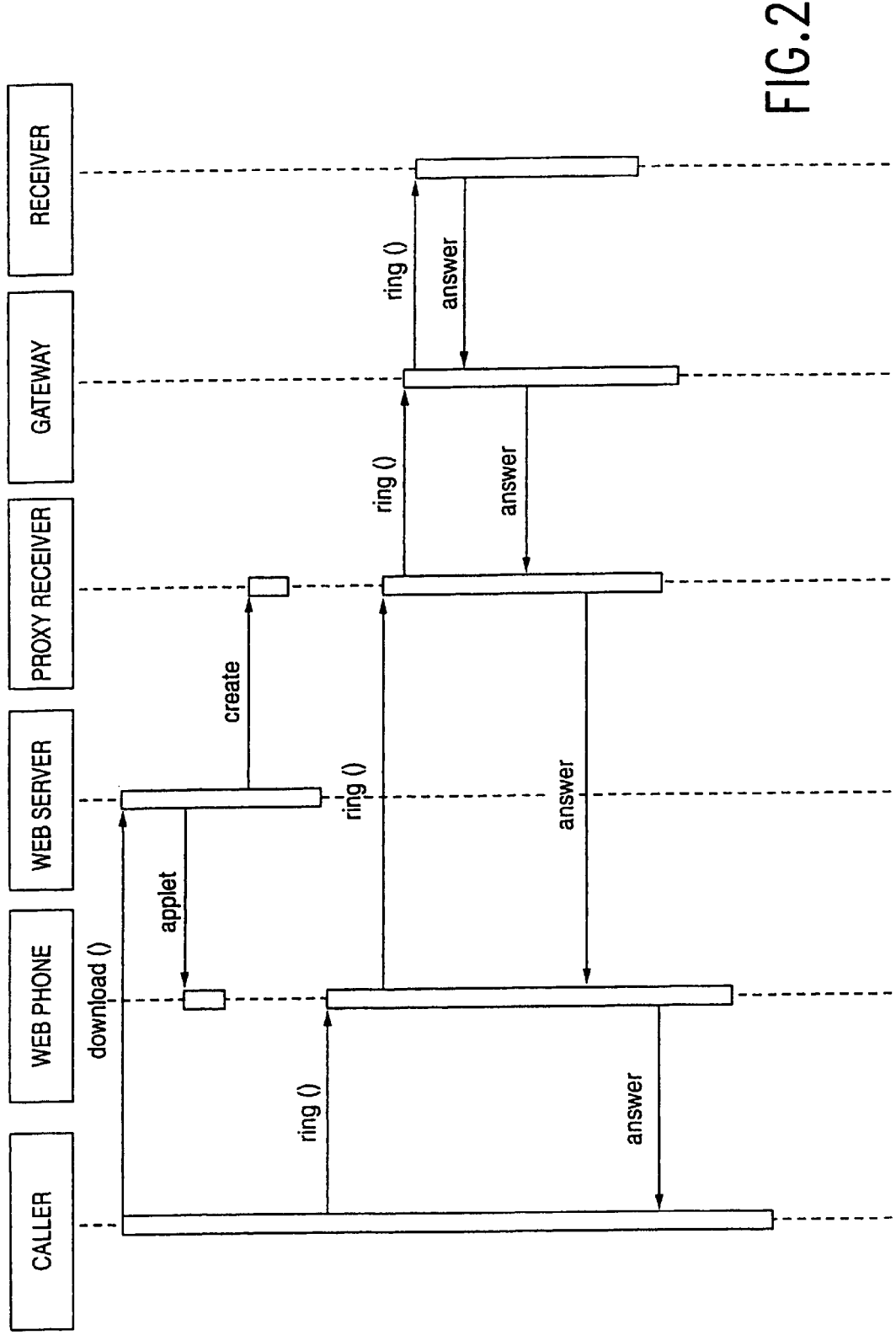
FIG. 2 illustrates the exchange of messages among the various elements that comprise the present universal Internet based telephony system.
Figure 3A:
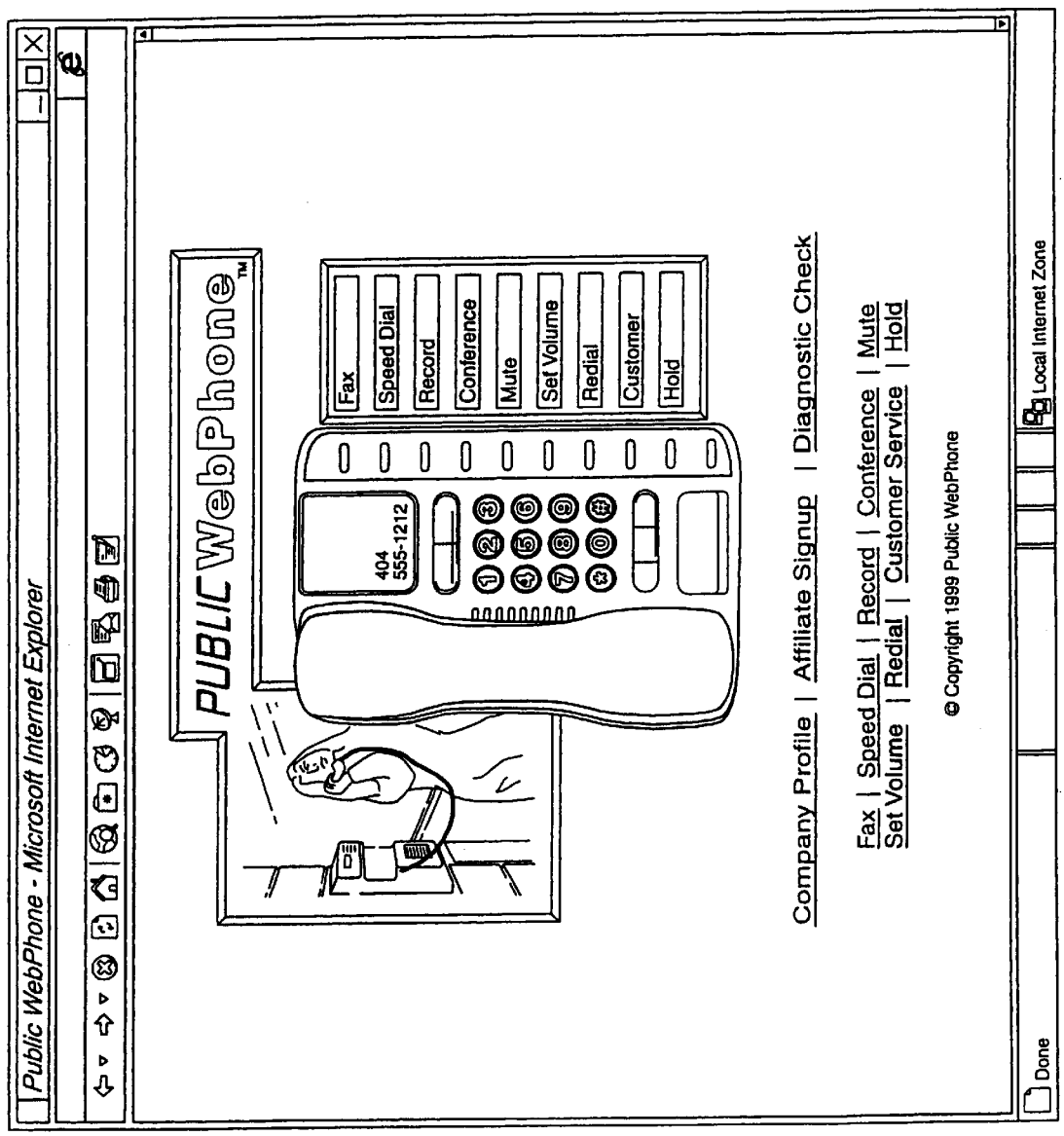
FIGS. 3A and 3B illustrate typical displays that are produced by a web server upon accessing a telephony system according to the present invention.
Figure 4:
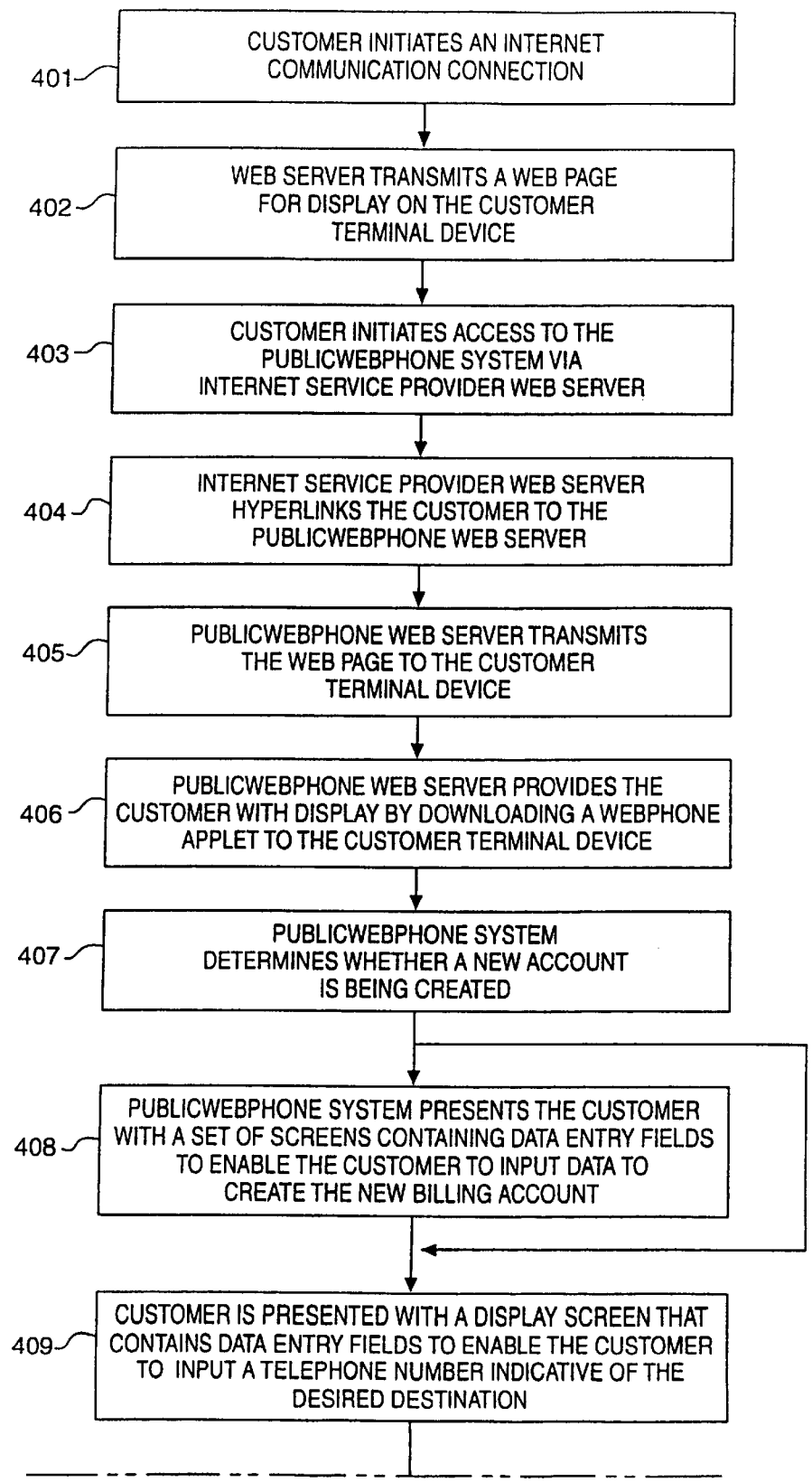
FIGS. 4 and 5 illustrate in flow diagram form the operational steps taken by the present universal Internet based telephony system to provide Internet telephone service to a customer in the instance of a call origination.
Figure 5:
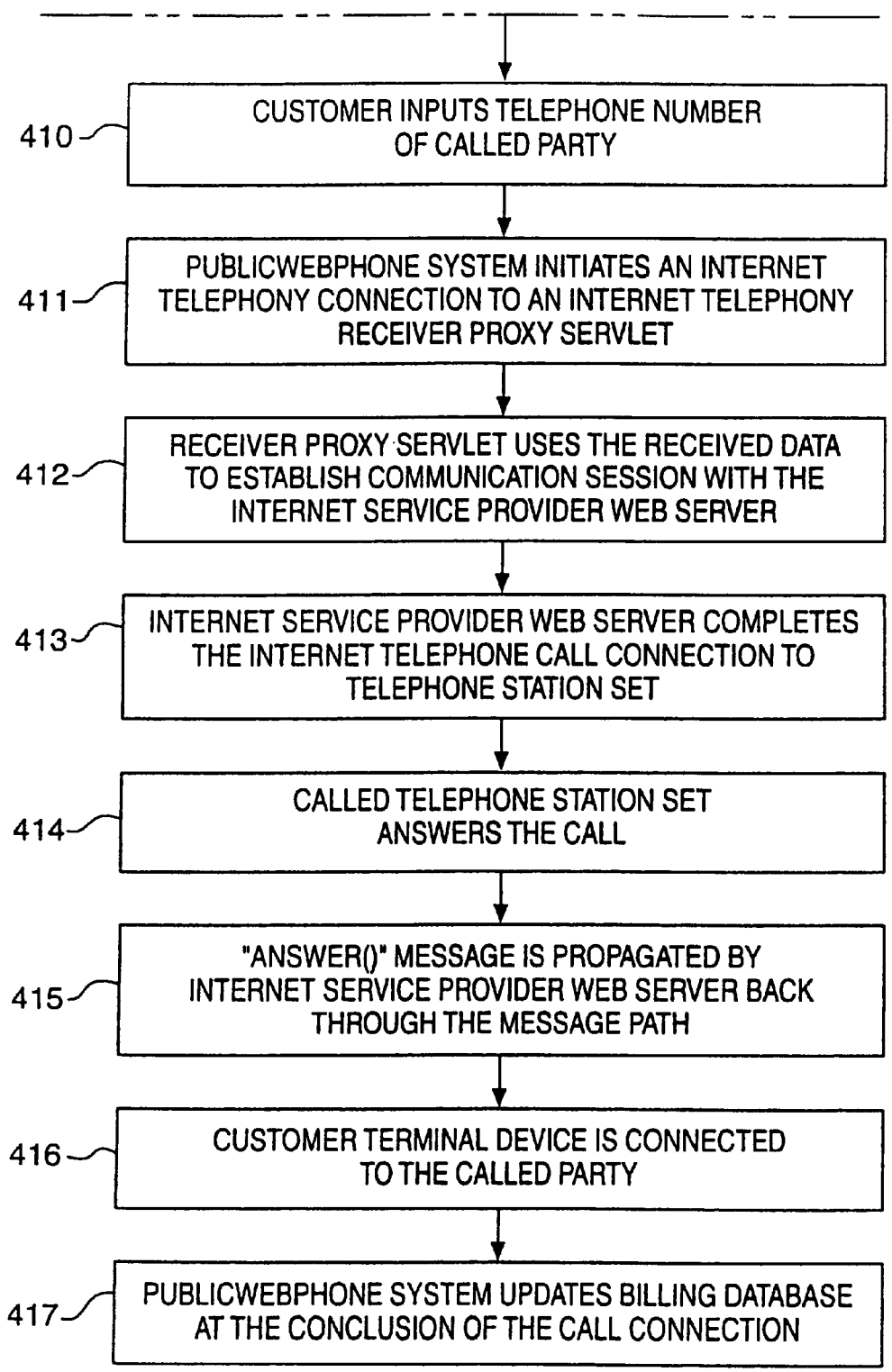

FIG. 2 illustrates the exchange of messages among the various elements that comprise the present universal Internet based telephony system 100 and the communications systems and devices illustrated in FIG. 1, FIG. 3A illustrates a typical display that is produced by a web server to enable a user to access the present universal Internet based telephony system 100 and FIGS. 4 and 5 illustrate in flow diagram form the operational steps taken by the present universal Internet based telephony system 100 to provide Internet telephone service to a customer in the instance of a call origination. The universal Internet based telephony system 100 typically resides on/includes an Internet web server, such as web server 100A, as the host. The customer's web browser is the proxy or pseudo-client and enables the customer to talk to an Internet Service Provider 105 via a set of communication scripts. These scripts are typically Java Enabled Internet Browser scripts resident on the customer's terminal device T1. The web server 100A (or any other web server reachable through Internet Service Provider 105) can simply be equipped with a universal Internet based telephony system icon, associated display and hyperlink data that enables a customer who clicks on the displayed icon to be hyper linked to the universal Internet based telephony system 100. The universal Internet based telephony system 100 allows the customer to place telephone calls to a destination by using the customer's account name (login) and password via the web browser user interface that is executed on the customer's terminal device T1. The web page provided by the web server 100A to the customer terminal device T1 functions as a password protected user interface for the Internet telephony process.

The following description includes a description of the process whereby a customer establishes a customer universal Internet based telephony system account for Internet telephony, and also indicates how the customer initiates a universal Internet based telephony system Internet telephone call an existing universal Internet based telephony system account, from any terminal device.

Figure 3B:
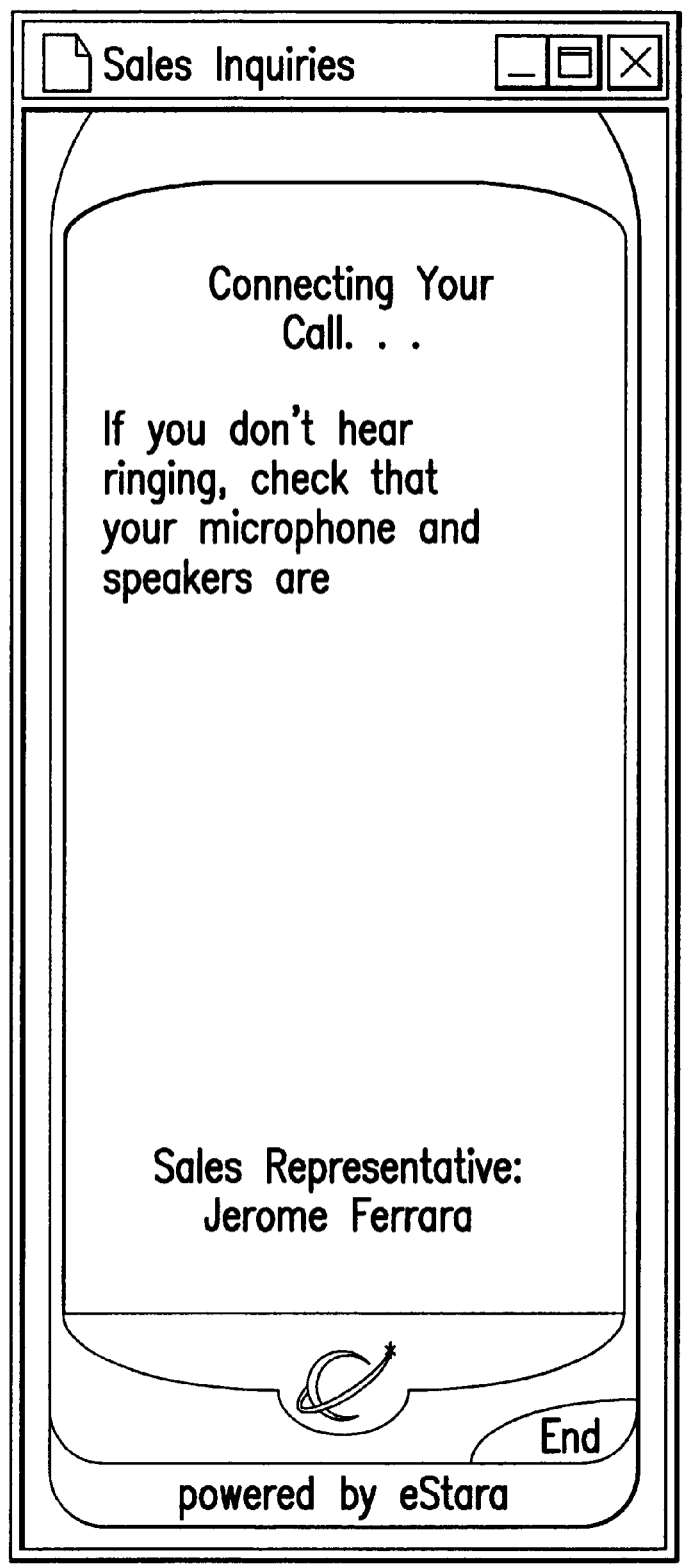

The customer at step 401 initiates an Internet communication connection by activating the Java Enabled Internet Browser executing on the customer terminal device T1 to initiate a local telephone call via communications network LEC1 to the telephone access number of the customer's Internet Service Provider 105. This communication connection is via the Public Switched Telephone Network (PSTN) and serves to provide the customer with a physical connection from the customer's terminal device T1 to the Internet Service Provider 105. The web server of the Internet Service Provider 105 that is accessed in this manner transmits a web page for display on the customer terminal device T1 at step 402. As part of the web page, the Internet Service Provider 105 can display an icon indicative of the availability of universal Internet based telephony system 100 where the customer can initiate an Internet telephone call to any destination, or the icon can represent a predefined telephone number that automatically executes a script upon selection to initiate an Internet telephone call to a designated destination (in such an embodiment, a display such as the display shown in FIG. 3B, rather than FIG. 3A, is preferably presented at the customer's terminal device T1). Alternatively, the customer's terminal device T1 can be equipped with an icon which presents the universal Internet based telephony system to the customer as an accessible service option, and the customer can initiate the universal Internet based telephony system Internet access by simply clicking on this desktop icon for direct connection to the universal Internet based telephony system.

The customer at step 403 can initiate access to the universal Internet based telephony system 100 by inputting the URL of the universal Internet based telephony system web server 100A via the customer's web browser that is executing on the customer's terminal device T1 or by clicking on the displayed universal Internet based telephony system icon which is presented by the web page of the Internet Service Provider 105 to which the customer is connected. The Internet Service Provider 105 at step 404 hyperlinks the customer to the universal Internet based telephony system web server 100A when the customer clicks on the displayed icon, which actions transmit a "download( )" message to the web phone system 100, and at step 405 the universal Internet based telephony system web server 100A transmits the web page of FIG. 3A or FIG. 3B, as appropriate, to the customer terminal device T1. The universal Internet based telephony system web server 100A at step 406 provides the customer with a display by downloading an IP phone applet to the customer terminal device T1 that executes the customer terminal device portion of the universal Internet based telephony system 100 and enables the customer to either establish a new account with the universal Internet based telephony system 100 or use an existing account. The applet includes the signaling media streaming and media control specific to the microphone and speaker API of the specific customer terminal device T1 through a server side query of the customer terminal device T1. The page can be one page containing a graphic representation of a telephone and two click through links. The first click through reads "If you already have an account click here." This prompts the user for their account number and allows passage to an active Telephone Java Script where they can click on the numbers to dial and thus invoke HTML which places the telephone call. The phone has a volume button and a clarity button. The second link reads "Set up an account with universal Internet based telephony system". This secure script prompts the user for their new account information and allows the user to choose from a menu of payment methods including secure credit card or bill the customer directly through their current service provider. Once submitted, the user has an immediate response as to acceptance of the credit card and/or whether their service provider currently has a billing arrangement with Universal Internet based telephony system.

At step 407, the universal Internet based telephony system 100 determines, pursuant to the customer's data input via customer terminal device T1, whether a new account is being created. If the customer elects to establish a new account, processing advances to step 408 where the universal Internet based telephony system 100 presents the customer with a set of screens containing data entry fields to enable the customer to input the customer specific data and billing information, in well known fashion, that is necessary to create the new billing account. The customer is provided with a virtual telephone number to enable the customer to access this service from anywhere. Once the customer information is received and validated, processing advances to step 409 where the customer is presented with a display screen that contains data entry fields to enable the customer to input a telephone number indicative of the desired destination at step 410. The user interface for the address book is not part of the applet but rather resides on the server and is accessible via the web page. The call is placed through an interaction between the applet (media control, media streaming) to the web gateway and signaling at the same time between applet's user agent (signaling) and the SIP location server, which operate together piece the call back together for the called party.

At step 411, the keystrokes input by the customer are used by the universal Internet based telephony system 100 to initiate an Internet telephony connection by forwarding the received data ("create" in FIG. 2) to an Internet Telephony Receiver Proxy Servlet 142, along with the customer's login and password identity. In the case of a predetermined destination being represented by the selected icon, the step of customer input of a telephone number is bypassed, since the web server 105 already has the destination telephone number data. The web server 100A includes the URL of Web server 105 to enable the Receiver Proxy Servlet 142 to credit the web server 105 with being the source of the Internet telephony call. The Receiver Proxy Servlet 142 at step 412 uses the received data to establish a communication session with the Internet Service Provider web server 105 located proximate to the destination terminal device T2 or telephone station set SS1. The Internet Service Provider web server 135 completes the Internet telephone call connection at step 413 by extending the call connection ("ring ( )" of FIG. 2) to telephone station set (for example) SS1 via the communications network 102. When the called telephone station set SS1 answers the call at step 414, an "answer( )" message is propagated by Internet Service Provider Web server 135 at step 415 back through the message path illustrated in FIG. 2 and the customer at customer terminal device T1 is connected at step 416 to the called party ("Receiver") located at telephone station set SS1 to enable the two parties to communicate in a telephone communication session via the Internet 103 and the communications network 101, 102. The universal Internet based telephony system 100 chronicles each Internet telephone call, including the source web page, call duration, call destination and this data is used to update a billing database 145 at step 417 at the conclusion of the call connection. The billing can be via pre-established customer account, credit card, associated telephone number, associated Internet user identification, and the like.

This system architecture is Fat Host/Thin Client in that the universal Internet based telephony system software allows the customer to remotely operate the universal Internet based telephony system 100 with the web page provided by the web server 100A functioning as the user interface. As a speed enhancement in this process, when the customer browses to the web server 100A, the web page is downloaded to the customer's terminal device T1 and cached for future speed enhancement without direction from the customer. Thus, any terminal device, such as a personal computer, with a multimedia package that includes a microphone and speakers, can function as a telephone without the user having to download any software.

Personal Computer to Personal Computer

Figure 6:
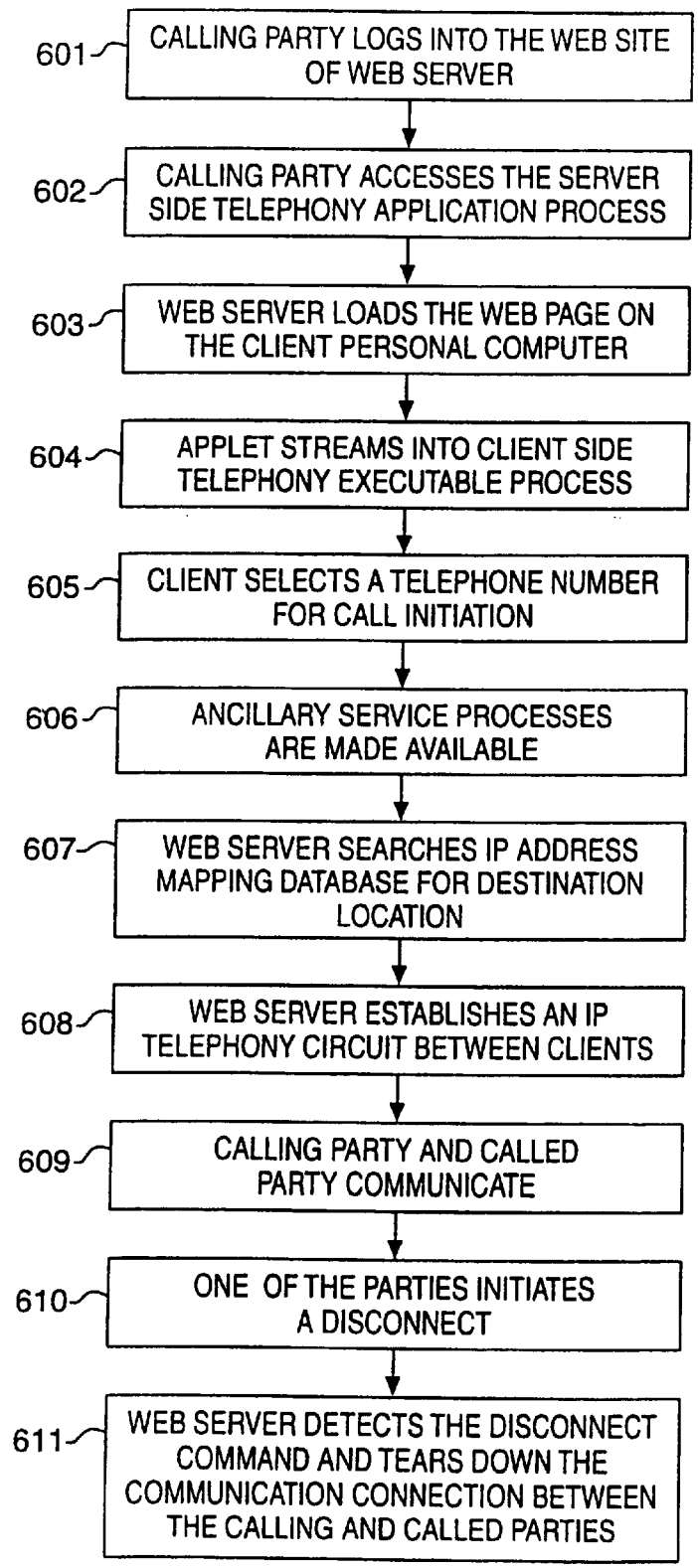
FIG. 6 illustrates in flow diagram form the process flow that occurs when a calling party logs into the web site and initiates a call to another user who is also logged into the Web site.

The universal Internet based telephony system 100 can be used for processing communications connections that are Personal Computer to Personal Computer. FIG. 6 illustrates in flow diagram form the process flow that occurs when a calling party at customer terminal device T1 logs into the web site of web server 100A and initiates a call to a called party at customer terminal device T3 who is also logged into the web site of web server 100A. At step 601, the calling party at customer terminal device T1 logs into the web site of web server 100A, as described above with respect to FIG. 4, to access the web server 100A and the server side telephony application process 111 that executes thereon at step 602. The web server 100A loads the web page on the client personal computer T1 at step 603. The telephony application (applet) streams into the client side telephony executable process 115 located in the memory of the customer terminal device T1 at step 604 and the client selects a telephone number for call initiation at step 605. Since the called party is also logged into the web site of web server 100A via customer terminal device T3 and is a subscriber to the IP telephony service, the called party has been assigned a virtual telephone number, and can be accessed via this virtual telephone number. The virtual telephone number is 10 digits (like an actual telephone number) in some embodiments, with the area code portion of the 10 digit number corresponding to a "special" area code. In other embodiments, the virtual telephone number is an alphanumeric sequence that does not resemble an actual telephone number. Therefore, the calling party can input this virtual telephone number into the web site 100A to initiate a call connection to the called party, regardless of where the called party is located. In addition, the ancillary service processes 112 related to the customer's selection are made available at step 606. The web server 100A at step 607 searches the IP address mapping database 114 for the destination location and if available, the web server 100A establishes an IP telephony circuit between clients, located at customer terminal devices T1 and T3, via the Internet at step 608. The calling party and called party communicate at step 609 and when the call is over, one of the parties initiates a disconnect at step 610. The web server 100A detects the disconnect command and tears down the communication connection between the calling and called parties at step 611.

Personal Computer to Telephone Station Set

The universal Internet based telephony system 100 can be used for processing communications connections that are Personal Computer to Telephone Station Set.

Figure 7:
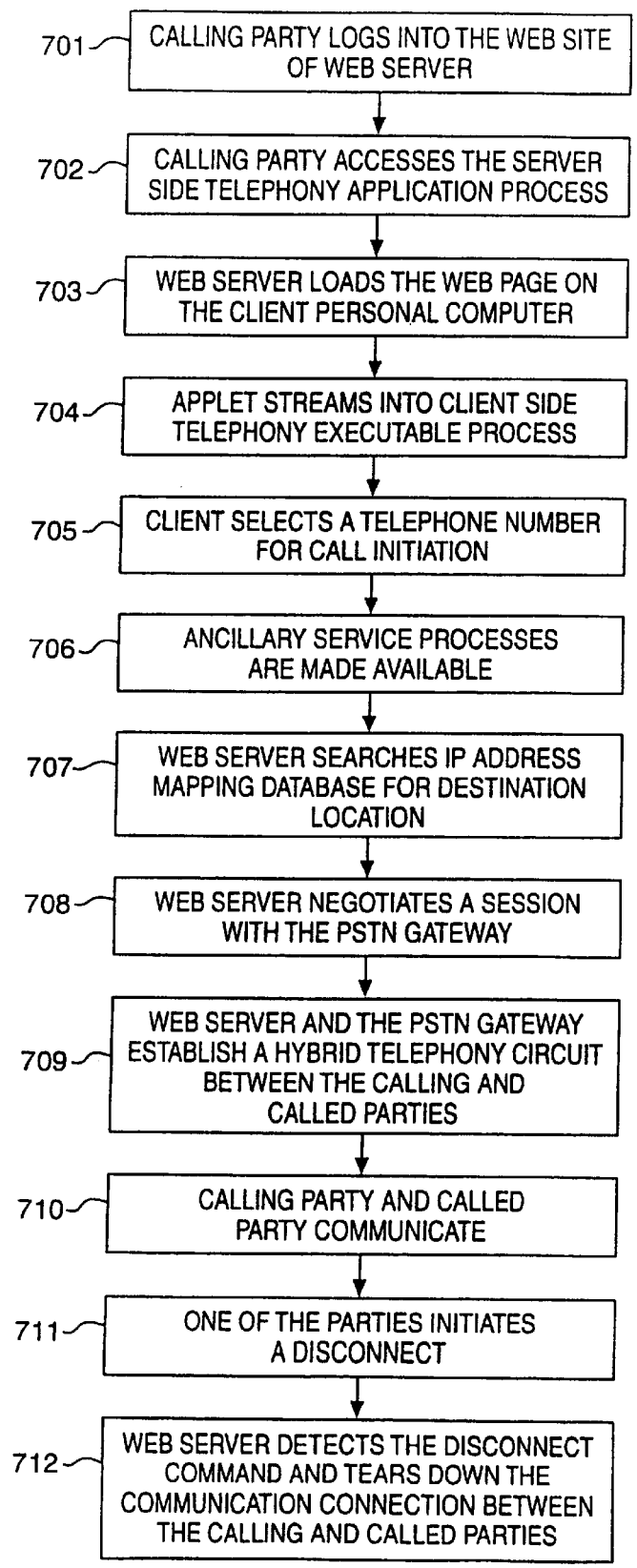
FIG. 7 illustrates in flow diagram form the process flow that occurs when a calling party logs into the web site and initiates a call to another user who is available via a telephone station set addressable at a traditional telephone number.

FIG. 7 illustrates in flow diagram form the process flow that occurs when a calling party logs into the web site of web server 100A and initiates a call to a called party who is available via a telephone station set SS1 addressable at a traditional telephone number. The calling party located at customer terminal device T1 logs into the web site of web server 100A at step 701, as described above with respect to FIG. 4, to access the web server 100A and the server side telephony application process 111 that executes thereon at step 702. The web server 100A loads the web page on the client personal computer T1 at step 703. The telephony application (applet) streams into the client side telephony executable process 115 located in the memory of the customer personal computer T1 at step 704 and the client selects a telephone number (which may be maintained in a permanent address book) for call initiation at step 705. In addition, the ancillary service processes 112 related to the customer's selection are made available at step 706. The web server 100A at step 707 searches the IP address mapping database 114 for the destination location that is defined by the telephone number. Since the destination is a traditional telephone station set, the web server 100A negotiates a session with the PSTN gateway 100B at step 708. If a communication path is available, the web server 100A and the PSTN gateway 100B establish a hybrid telephony circuit between the calling and called parties at step 709. The calling party and called party communicate over this hybrid telephony circuit at step 710 and when the call is over, one of the parties initiates a disconnect at step 711. The web server 100A and/or the PSTN gateway 100B detect the disconnect command and tear down the communication connection between the calling and called parties at step 712.

Telephone Station Set to Personal Computer

Figure 8:
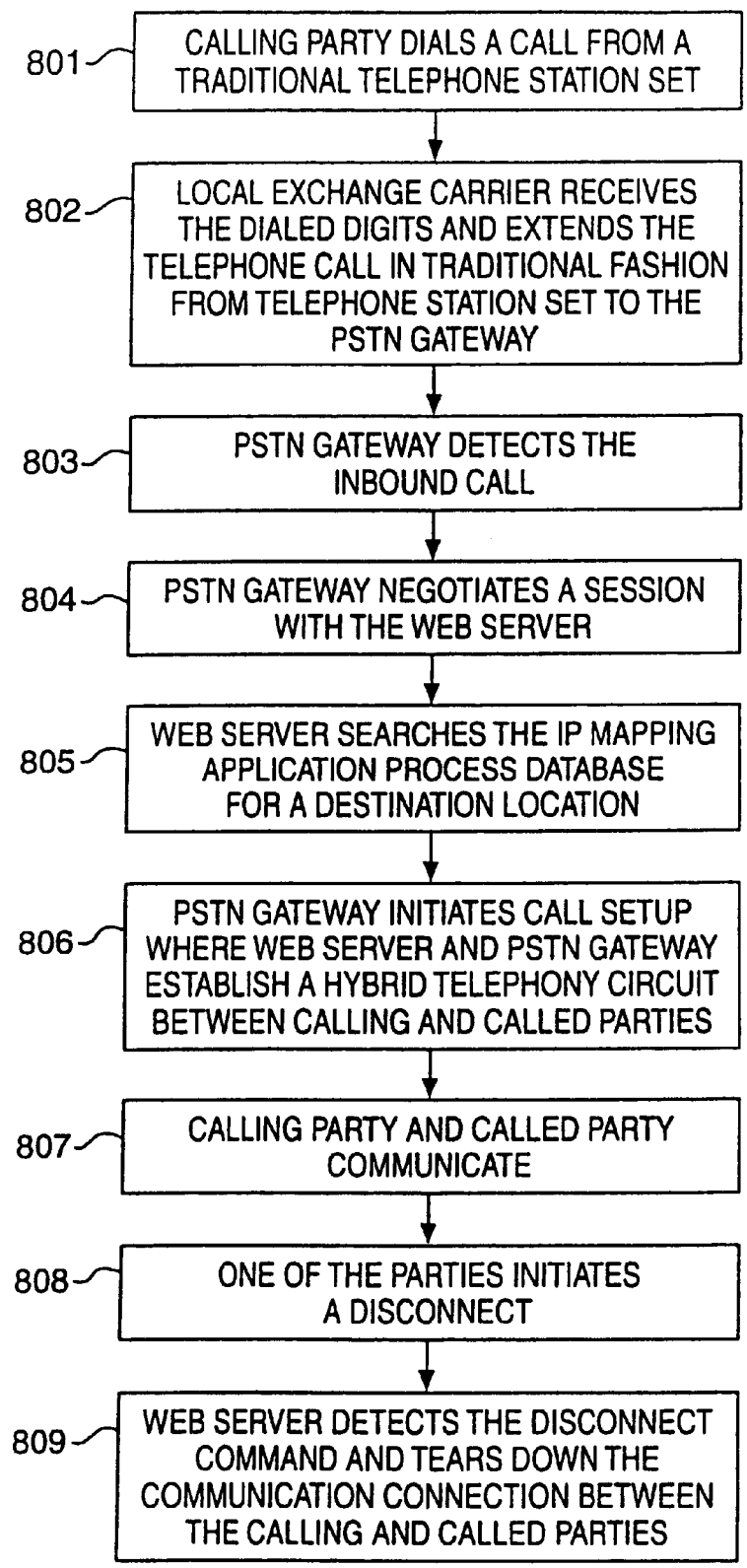
FIG. 8 illustrates in flow diagram form the process flow that occurs when a calling party dials a call from a traditional telephone station set assigned a telephone number to a personal computer.

The universal Internet based telephony system 100 can be used for processing communications connections that are Telephone Station Set to Personal Computer. FIG. 8 illustrates in flow diagram form the process flow that occurs when a calling party dials a call at step 801 from a traditional telephone station set SS1, which is assigned a telephone number, to a personal computer T1 that is served by the universal Internet based telephony system 100. In this embodiment, the personal computer is assigned to one of a block of unique telephone numbers associated with gateway such that the gateway, by virtue of the number dialed by the calling party (where the gateway is connected to one or more trunk lines and has a block of numbers, the DID, or direct inward dial digits, can be used to identify the number dialed by the calling party), can determine the party to which the call is directed. In other embodiments, a single number for the gateway is dialed and, when the gateway "answers" the call, the user enters an ID number for the desired party via the dialpad. The local exchange carrier LEC2 at step 802 extends the telephone call in traditional fashion from telephone station set SS1 to the PSTN gateway 100B via the switching network of the local exchange carrier LEC2 and the inter-exchange carrier 104. At step 803, the PSTN gateway 100B detects the inbound call. The PSTN gateway 100B, at step 804, negotiates a session with the web server 100A, which searches the IP mapping application process database 114 at step 805 for a destination location corresponding to the number dialed by the calling party (or, in other embodiments, the ID number entered by the calling party). The PSTN gateway 100B signals busy or initiates a call setup at step 806 if a communication path is available, where the web server 100A and the PSTN gateway 100B establish a hybrid telephony circuit between the calling and called parties. The calling party and called party communicate at step 807 and when the call is over, one of the parties initiates a disconnect at step 808. The web server 100A and/or the PSTN gateway 100B detect the disconnect command and tear down the communication connection between the calling and called parties at step 809.

Call Center

Figure 9:
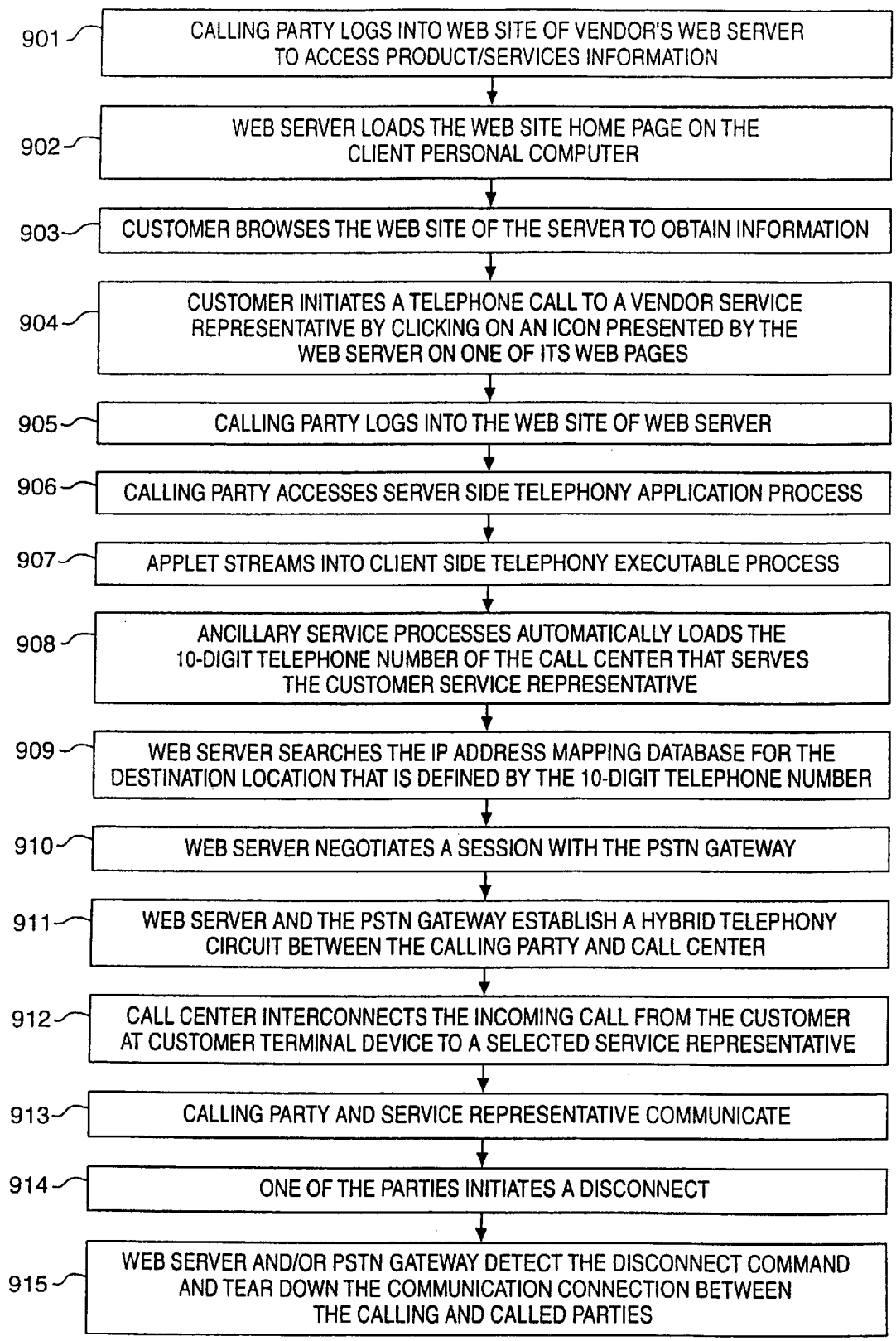
FIG. 9 illustrates in flow diagram form a case where the universal Internet based telephony system 100 customer can maintain concurrent communication connections via the Internet to provide both data and voice connections.

FIG. 9 illustrates in flow diagram form a case where the universal Internet based telephony system 100 customer can maintain concurrent communication connections via the Internet to provide both data and voice connections. For example, at step 901, the calling party at customer terminal device T1 logs into the web site of web server S1 to access product/services information that is provided by the vendor to customers via web werver S1. The web server S1 loads the web site home page on the client personal computer T1 at step 902. The customer can browse the web site of the server S1 to obtain information, in a well known manner, at step 903 and the customer can initiate a telephone call to a vendor service representative via the universal Internet based telephony system 100 at step 904 by clicking on an icon presented by the web server S1 on one of its web pages. The icon typically denotes a one of a plurality of possible destinations to which the customer can be linked and in this example, the icon represents the vendor's customer service representatives, who are available via call center 104.

The calling party located at customer terminal device T1 by clicking on the icon at step 904, logs into the web site of web server 100A at step 905, as described above with respect to FIG. 4, to access the web server 100A and the server side telephony application process 111 that executes thereon at step 906. The telephony application (applet) streams into the client side telephony executable process 115 located in the memory of the customer personal computer T1 at step 907. The ancillary service processes 112 related to the icon activation automatically loads the telephone number of the call center 104 that serves the customer service representatives, located at telephone station sets CC1–CCk, at step 908. The web server 100A at step 909 searches the IP address mapping database 114 for the destination location that is defined by the telephone number. Since the destination is a call center 103 serving a plurality of traditional telephone station sets CC1–CCk (which is known because the number does not correspond to any virtual number in the IP address mapping database 114), the web server 100A negotiates a session with the PSTN gateway 100B at step 910. If a communication path is available, the web server 100A and the PSTN gateway 100B establish a hybrid telephony circuit between the calling party and call center 104 at step 911. The call center 104 at step 912 interconnects the incoming call from the customer at customer terminal device T1 to a selected service representative located at telephone station set CC1 and the calling party and service representative communicate over this hybrid telephony circuit at step 913 and when the call is over, one of the parties initiates a disconnect at step 914. The web server 100A and/or the PSTN gateway 100B detect the disconnect command and tear down the communication connection between the calling and called parties at step 915.

Figure 10:
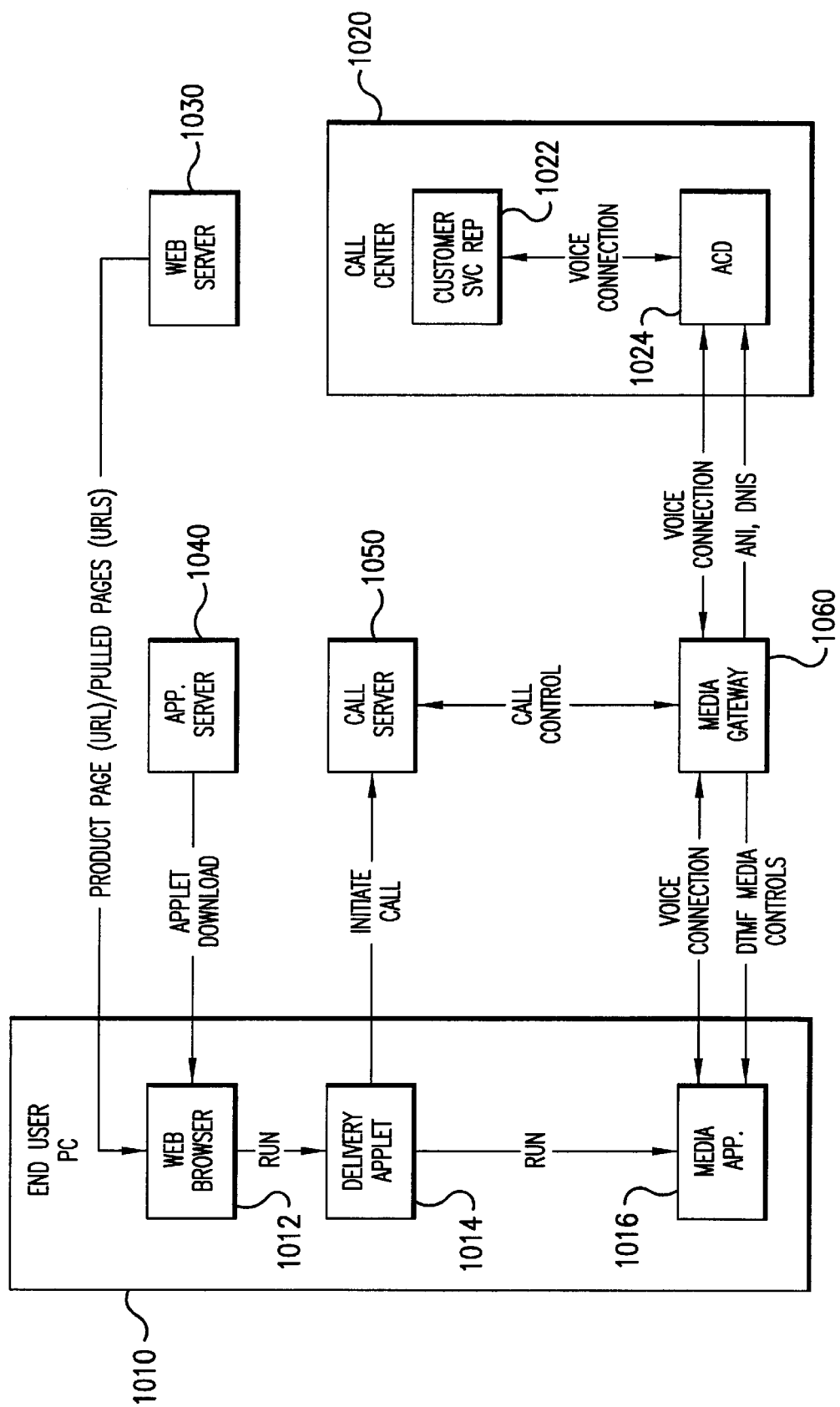
FIG. 10 is a block diagram of a system for establishing a phone call from a personal computer to a telephone according to an embodiment of the present invention.
Figure 11A:
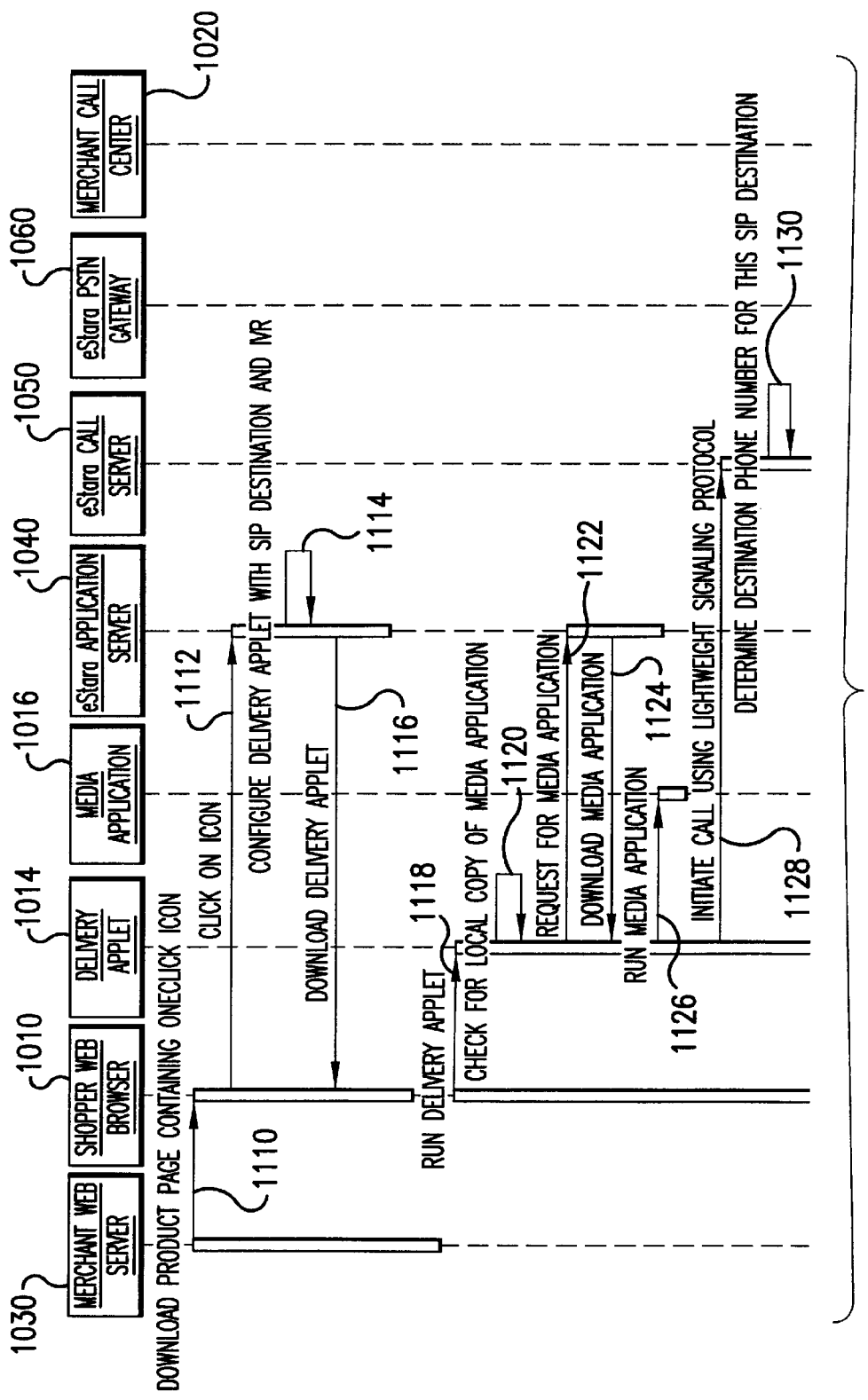
FIG. 11 is a sequence diagram showing the steps performed by the embodiment of FIG. 10.
Figure 11B:
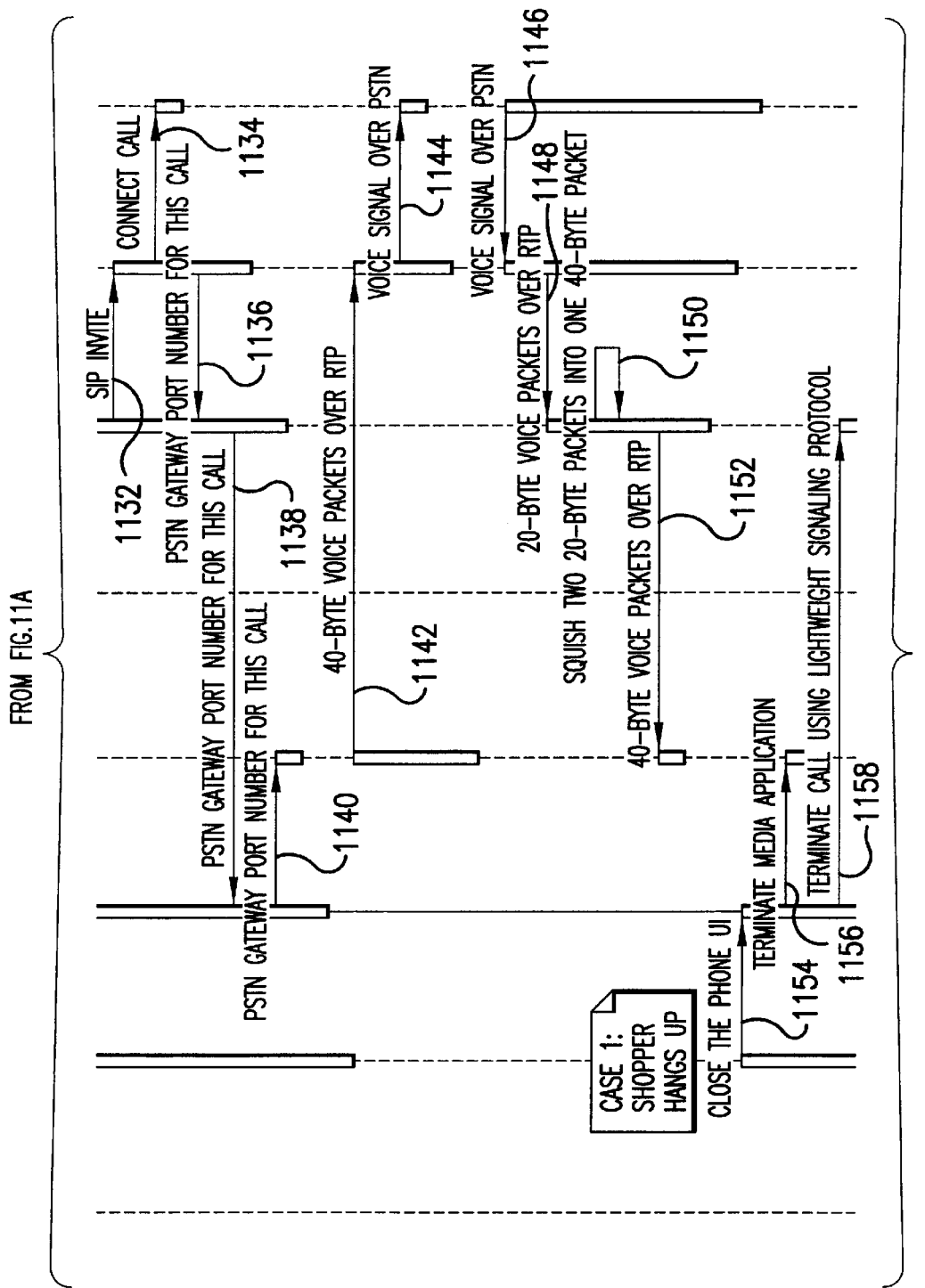
Figure 11C:
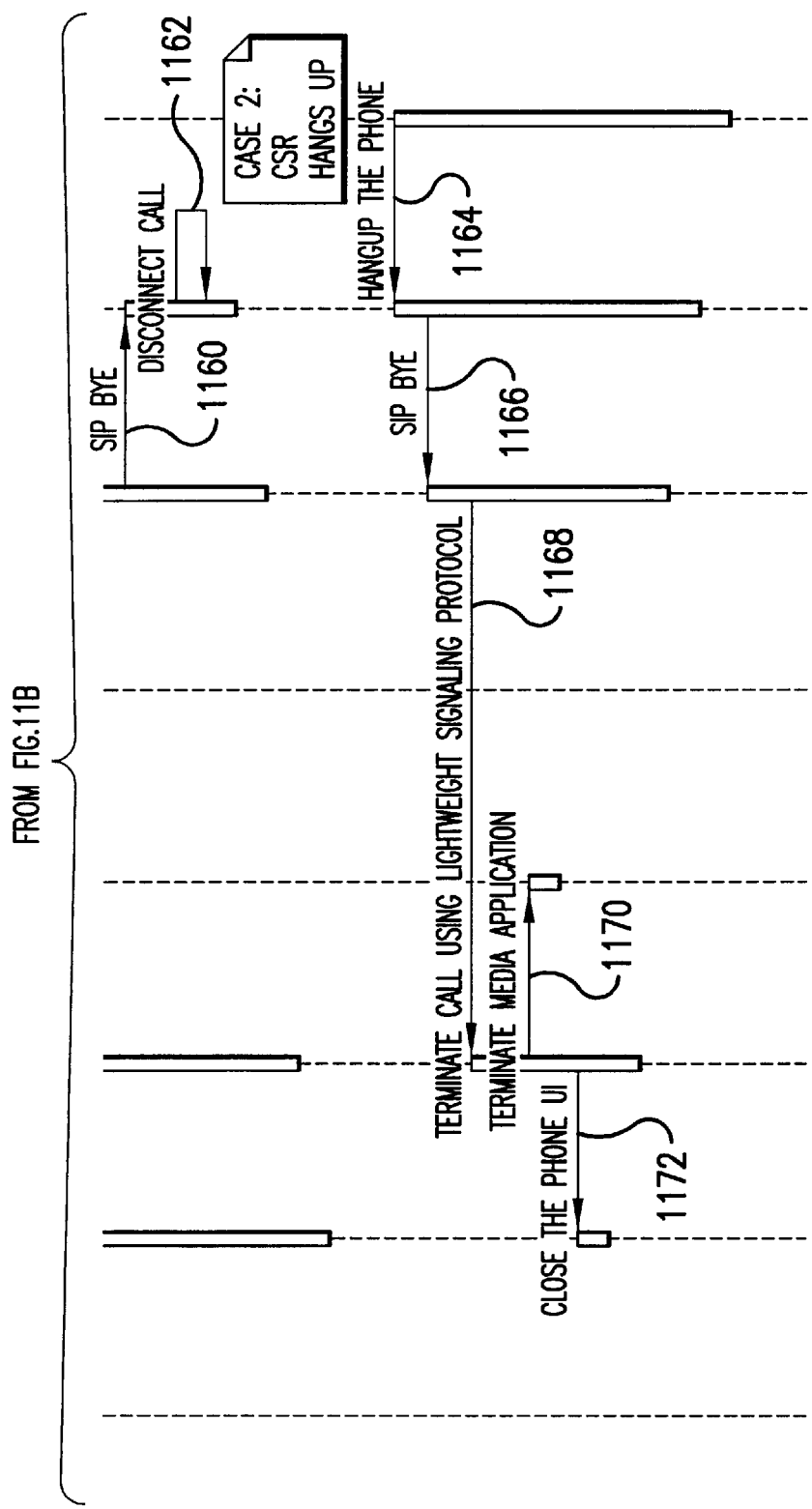

Another embodiment of the invention believed to be particularly applicable in a call center environment (but which is also applicable to any situation in which a call to a specific destination is desired) is illustrated in FIGS. 10 and 11. In this embodiment, a merchant doing business over the Internet preferably contracts with an internet telephony service provider to enable internet telephony between consumers who visit the merchant's website and the merchant's representatives present at a call center.

The process begins when an end user directs a web browser 1012 on an end user PC 1010 to a web site hosted on a merchant's web server 1030. The merchant's web server 1030 downloads various information for display on the web browser 1012 such as information pertaining to goods and services being offered for sale. Included among this downloaded information (step 1110 of FIG. 11) is at least one icon which, when clicked on by the end user, will initiate an internet telephone transaction. As used herein, the term icon refers to any object on a web page, including graphical objects and textual hypertext objects, which may be "clicked on" by an end user. The internet telephony icon (which is also referred to as the ONE CLICK CONTACT™ or ONE CLICK™ icon) preferably includes an application server address, a merchant ID, a link ID, and a customer/session ID. The application server address is the address of a server which will provide certain utilities (as explained further below) to the end user PC 1010 in the event that the end user desires to initiate an internet telephony connection. The merchant ID is a unique identifier that identifies the particular merchant to the internet telephony service provider. The link ID identifies the specific icon clicked on by the consumer. The link ID is provided because, preferably, the merchant's web site includes several internet telephony icons. For example, separate icons may be provided for customer service, billing information, product return information, etc. Separate icons may also be provided for customer service for different products. For example, if a clothing merchant offers both clothing and shoes on its website, then one internet telephony icon may be provided on web pages offering shoes for sale, while a different internet telephony icon may be provided on web pages offering clothing. The customer/session ID is used to identify the customer or the session. For example, in some embodiments, a merchant website may require a consumer to log in. In this case, as the customer is known to the merchant, the customer ID represents an identification of the customer provided by the merchant. In other embodiments where a specific customer is not known to the merchant, an identification of the session number may be provided by the merchant. As explained further below, the session number may be used to allow a customer service representative to identify what information is being displayed by the consumer's web browser and/or to synchronize a customer service representative's screen display to that of the consumer.

It should be noted that, in some preferred embodiments, the icon, including the merchant ID, link ID and customer/session ID, is downloaded to the end user PC 1010 prior to any indication from the end user that an internet telephony connection is desired. Providing the icon and its associated information in advance reduces the total time required to complete the internet telephony connection as measured from the point at which the end user clicks on the icon (which is how the user/consumer will measure the delay). Of course, the icon could also be provided upon an indication from the consumer that an internet telephony connection to the merchant is desired. For example, each web page of the merchant's website could include a telephone call icon which includes none of the aforementioned icon identification information and which, when clicked, triggers the merchant web server 1030 to generate an internet telephony icon including the icon identification information (merchant ID, link ID, customer/session ID) discussed above and present the user with a new web page that includes the internet telephony icon with the identification information.

It should also be noted that not all of the icon identification information fields need be used in all applications. For example, where a merchant sells a single product on a website, or where all customer service calls are directed to the same location or are distributed at the call center without regard to which web page is prompting the customer call, the link ID field and/or the customer/session ID field could be left blank or not included. Alternatively, the link ID field may be unique for all icons serviced by the internet telephony service provider such that the link ID identifies the merchant as well as the specific link. In this situation, the merchant ID is not necessary. Furthermore, in certain embodiments, the actual telephone number of the call center may be included in the icon in addition to or instead of one or more icon identification fields.

When a consumer clicks on the internet telephony icon (step 1112) at his web browser 1010, a message is sent to an internet telephony service application server 1040 using the application server address included in the internet telephony icon. The message, which is preferably a standard download ( ) message, includes the icon identification information. The application server 1040 then configures a delivery applet 1014 for the end user PC 1010 at step 1114. The delivery applet 1014 includes the address of a call server 1050. When the delivery applet 1014 has been configured, it is downloaded to the end user web browser 1012 at step 1116. In preferred embodiments, the delivery applet 1014 is as small as possible, preferably less than 10K bytes. This is because the delivery applet 1014 is downloaded each time a customer clicks on an internet telephony icon and it is highly desirable to minimize delays in establishing the requested internet telephony connection once the internet telephony icon is clicked.

Once the delivery applet 1014 is received at the end user web browser 1012, it executes at step 1118. The delivery applet 1014 causes a new internet telephony browser window to open. By causing a new window to open, the end user is still able to view the merchant web page that was being viewed when the internet telephony icon was clicked. Next, at step 1120, the delivery applet 1014 determines whether media application software is present on the end user PC 1010. The media application software, whose functions will be discussed in greater detail below, provides the low-level processing necessary to digitize the consumer's voice and packetize the digitized voice information for transmission over the internet. In preferred embodiments, the media application software is also as small as possible, preferably less than 100K bytes. If the media application software is not present, the delivery applet 1014 requests (step 1122) the media application software from the application server 1040. The application server 1040 downloads the media application software at step 1124. When the delivery applet 1014 has received the media application software, or when it is found on the end user PC 1010, the delivery applet starts execution of the media application 1016 at step 1126.

As mentioned above, the media application software performs the low level tasks required for internet telephony. One task performed by the media application is the encoding and packetization of voice information input from a microphone on the end user PC 1010 and the decoding of voice packets received from a called party over the internet. This is preferably accomplished using a commercially available CODEC. The encoding/decoding algorithms employed by the CODEC software package may comply with publicly available standards, such as the G723.1, G729 and/or G729A standards promulgated by the ITU. Software implementing algorithms conforming to these standards is available from the ITU itself, or may be purchased from a variety of commercial vendors such as the Elemedia division of Lucent. Alternatively, the CODEC may be proprietary, such as the SX9600 CODEC available from the Elemedia division of Lucent. Other tasks include interfacing with the PC's microphone and speakers to input and output voice information. The media application may optionally encrypt and decrypt the transmitted and received voice packets.

After the media application has been started, the delivery applet 1014 sends an initiate call message to the call server 1050. The initiate message includes the icon identification information other than the address of the application server 1040. The call server uses the icon identification information to identify the location of the party with whom the customer wishes to speak. For a connection to a call center over the PSTN (sometimes referred to as PC to phone), the location corresponds to a telephone number. As will be discussed further below, the connection to the call center may also be implemented over the Internet (sometimes referred to as PC to PC). The location may decided by a number of factors. In a simple case, the merchant ID is used to retrieve a telephone number associated with the merchant. In other cases, the merchant ID in combination with the link ID is used to select from a plurality of merchant telephone numbers based upon the location of the link clicked on the merchant's website. In still other embodiments, one or more portions of the icon identification information is used together with an additional factor such as time of day to select a telephone number. For example, if a consumer clicks on an internet telephony icon at 7 p.m. e.s.t., and the merchant's east coast call center is closed but the west coast call center is still open, a telephone number for the west coast call center will be selected instead of a telephone number for the east coast call center, which would have been selected had it been open. Those of skill in the art will recognize that there are numerous other factors that could be used in addition to or instead of the icon identification information to select a destination telephone number. These factors could also by dynamically modified by the merchant, such as when a merchant instructs the call server 1050 to temporarily redirect calls intended for a first call center to a second call center when the first call center is experiencing a technical difficulty or when the call volume at the first center is high relative to the second call center (this is sometimes referred to as load balancing).

It will be appreciated by those of skill in the art that those embodiments described above, in which the icon identification information and/or additional factors are used to determine a destination telephone number, require significant server resources. This is especially true for a large scale system in which millions of calls may be handled in a single day. Therefore, in other preferred embodiments, the destination telephone number itself is included in the icon identification information. In this manner, the call server is not required to perform any processing to determine the telephone number, thereby saving significant call server resources. Of course, different numbers may be encoded into different icons on the website. This embodiment has the added benefit of allowing merchants to have direct control over which telephone numbers calls will be routed to since the merchant controls the routing by simply changing the icon on their website.

When the call server 1050 has determined a destination telephone number at step 1130, a message including the telephone number is sent to the PSTN gateway (also sometimes referred to as a media gateway) 1060 at step 1132. In embodiments with several PSTN gateways, the PSTN nearest to the call center 1020 is chosen so that local phone rates, rather than long distance rates, will apply to the call from the gateway 1060 and the call center 1020. The PSTN gateway 1060 then connects a call to the call center 1020 via the PSTN at step 1134. Next, at step 1136, the PSTN gateway 1060 informs the call server 1050 of the port number at the PSTN gateway 1060 to which voice packets for the call should be directed. The call server 1050 then passes the port number to the delivery applet 1014 on the end user PC 1010 at step 1138. The port number is then sent from the delivery applet 1014 to the media application 1016 at step 1140. The media application 1016 then begins sending voice packets to the PSTN gateway 1060 at step 1142, which in turn transmits the voice packet to the call center 1020 over the PSTN at step 1144. The call may be routed through an automatic call distributor (ACD) 1024 to a customer service representative telephone/PC 1022.

The call center 1020 also sends voice packets to the PSTN gateway 1060 at step 1146. These packets ideally are sent from the PSTN gateway 1060 to the media application 1016 on the end user PC 1010. However, in an alternative embodiment of the invention, the voice packets are instead sent to the call server 1050, where they are combined at step 1150 with other voice packets to form a larger voice packets and then transmitted to the media application 1016 at step 1152, which in turns converts the packets back to analog and sends the converted signal to speakers or a headset attached to the end user PC 1010. This intermediate combination step is performed in order to compensate for particular hardware used in an actual implementation of the invention.

The exchange of packets between the media application 1016 and the call center 1020 continues until one party or the other terminates the call. If the end user wishes to terminate the call, the end user clicks on a "hang up" button or closes the internet telephony browser window at step 154. The delivery applet 1014 then terminates the media application 1016 at step 1156 and sends a terminate message to the call server 1050 at step 1158. The call server 1050 then sends a terminate message to the PSTN gateway 1060 at step 1160, which in turn terminates the call at step 1162.

Conversely, when the call center 1020 wishes to terminate the call, the call center 1020 hangs up at step 1164. The PSTN gateway 1060 recognizes this situation and sends a terminate message to the call server 1050 at step 1166, which in turn sends a terminate message to the delivery applet 1014 at step 1168. The delivery applet 1014 then terminates the media application at step 1172 and closes the internet telephony browser window at step 1172, thereby terminating itself, to complete the process.

It should be noted that some or all of the media application software is left on the end user PC 1010 hard drive in preferred embodiments of the invention. This is done simply to reduce the software download time required to initiate an internet telephony connection when an end user makes repeated use of the service. The media application software is the same regardless of which merchant web resulted in the download of the media application. That is, even when the same internet telephony service provider provides service for a plurality of merchants, the media application is not different although the icon identification information and/or the delivery applet may be different. This should be distinguished from known internet telephony applications requiring the user to pre-configure the computer with software to implement the telephone call. Unlike the known systems, the present invention does not require the media application software to be present; rather, it takes advantage of the software if it has been previously loaded, thereby reducing the entire time required to complete a call. It should also be noted that, in preferred embodiments, the software left behind on the hard drive is not usable without additional software, which is only downloaded to the customer computer when an appropriate icon is clicked and which is not permanently saved. Security provisions, which are well known in the art, may be included to ensure that the software which is left behind is not improperly used. In other embodiments of the invention, no portion of the media application is permanently stored on the end user PC 1010 hard drive.

In the embodiment described above in connection with FIGS. 10 and 11, only limited use was made of the icon identification information. That is, the icon identification information was used by the call server 1050 to direct a call to a particular telephone number at a particular call center. However, the call center 1020 has no way of identifying the party making the incoming phone call. As is well known in the art, call centers often use information such as the ANI, DNIS or caller ID to identify an incoming call. This allows the call center to prepare for the call, which might include performing a "screen pop" for information about the customer. The information displayed might include such things as whether or not the customer is a preferred customer, the amount of business conducted by that customer, the customer's account number, status concerning the last order made by that customer, etc. It will readily be understood that in the above-described embodiments, performing a screen pop would not be successful as the ANI/DNIS/caller ID information would identify the PSTN gateway 1060 because that is where the call originates as far as the PSTN is concerned.

In order to overcome this problem, several strategies are available. These strategies may be divided into two types: in-band signaling and out-of-band signaling. In-band signaling refers to providing identification data in the same band as voice data (that is, as an audible signal), while out-of-band signaling refers to providing identification data in another manner. In some in-band embodiments, some or all of the icon identification information is encoded in the telephone call. For example, some portion of the icon identification information (e.g., the customer/session ID) could replace the ANI delivered to the call center 1020. Rather than replacing the ANI, the same information could be encoded into other fields, such as Signaling System 7 fields, associated with the telephone call. In other embodiments, the desired identification data is transmitted at the start of a phone call in a manner similar to a facsimile machine. Other variations on this theme are also possible.

One out-of-band strategy is described in further detail below in the section entitled "Providing Customer Data for CRM Purposes Using ANI Information Delivered by Conventional Telephone." In such an embodiment of the invention, the call center 1020 recognizes that an incoming call originates from a telephone because the ANI (or DNIS or caller ID) corresponds to a PSTN gateway 1060. A call center 1020 computer then queries a database maintained by the internet telephony server to correlate an incoming call to a particular customer. For example, the call center 1020 computer could send a message to the call server 1050 that includes the ANI when the call is received. The call server then determines the last call it instructed the gateway associated with the ANI to set up, retrieves the appropriate icon identification information, and sends it to the call center 1020.

Figure 12:
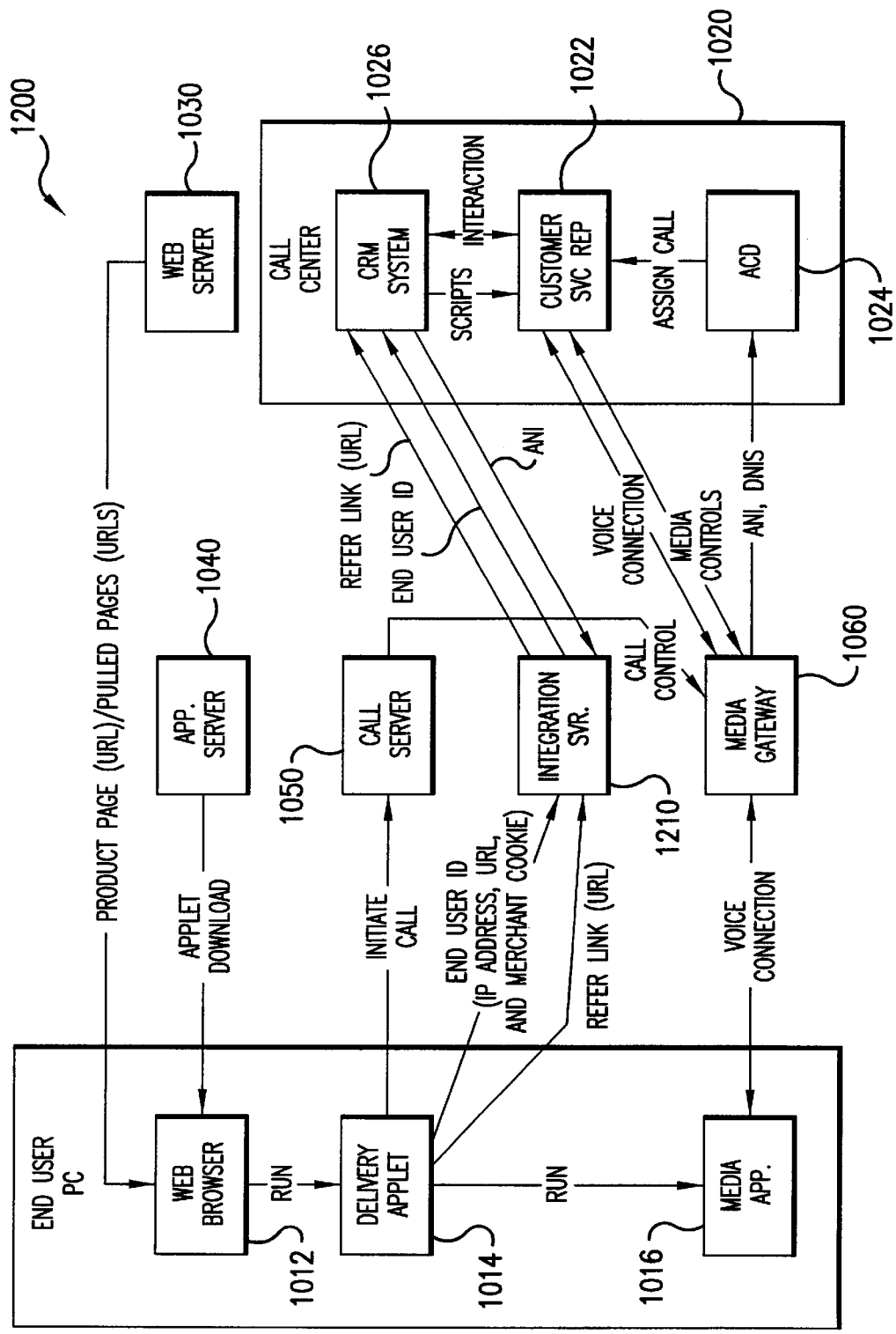
FIG. 12 is a block diagram of a system for establishing a phone call from a personal computer to a telephone and providing identification of the calling party according to an embodiment of the invention.

Another out-of-band embodiment of the invention is illustrated in FIG. 12. The system 1200 is similar to the system of FIG. 10, except that an integration server 1210 has been added. The message sequence in the system 1200 is similar to the message sequence illustrated in FIG. 11, with the addition of additional messages. When the delivery applet 1014 instructs the call server 1050 to initiate the call at step 1128, the delivery applet 1014 also sends a message to the integration server 1210 that includes some or all of the icon identification information. The delivery applet may also search for and include information from merchant cookies resident on the end user PC 1012 in this message. The message will also include a port number (sent by the call server 1050 at step 1138) associated with this information. The process then continues as described above until the PSTN gateway 1060 places the call to the call center 1020. The call center then obtains the ANI for the phone call and does a table lookup, using the ANI as an index, that reveals the ANI is associated with the gateway 1060. The call center 1020 then passes the ANI to the integration server 1210.

The integration server 1210 then uses the ANI to determine which port number of the gateway 1060 with which the call is associated. Each port (to which packets are sent by the media application 1016) on the gateway 1060 will be mapped to a single telephone line at the gateway 1060. Thus, each port will have a unique ANI associated with it. This information may be maintained at the gateway 1060 and/or the integration server 1210.

Once the port number of PSTN gateway 1060 is known, the integration server simply uses it as an index to retrieve the previously sent icon identification information and any other accompanying information. This information is then sent to the call center Customer Relationship Management system 1026 for use by the call center 1020.

Figure 13:
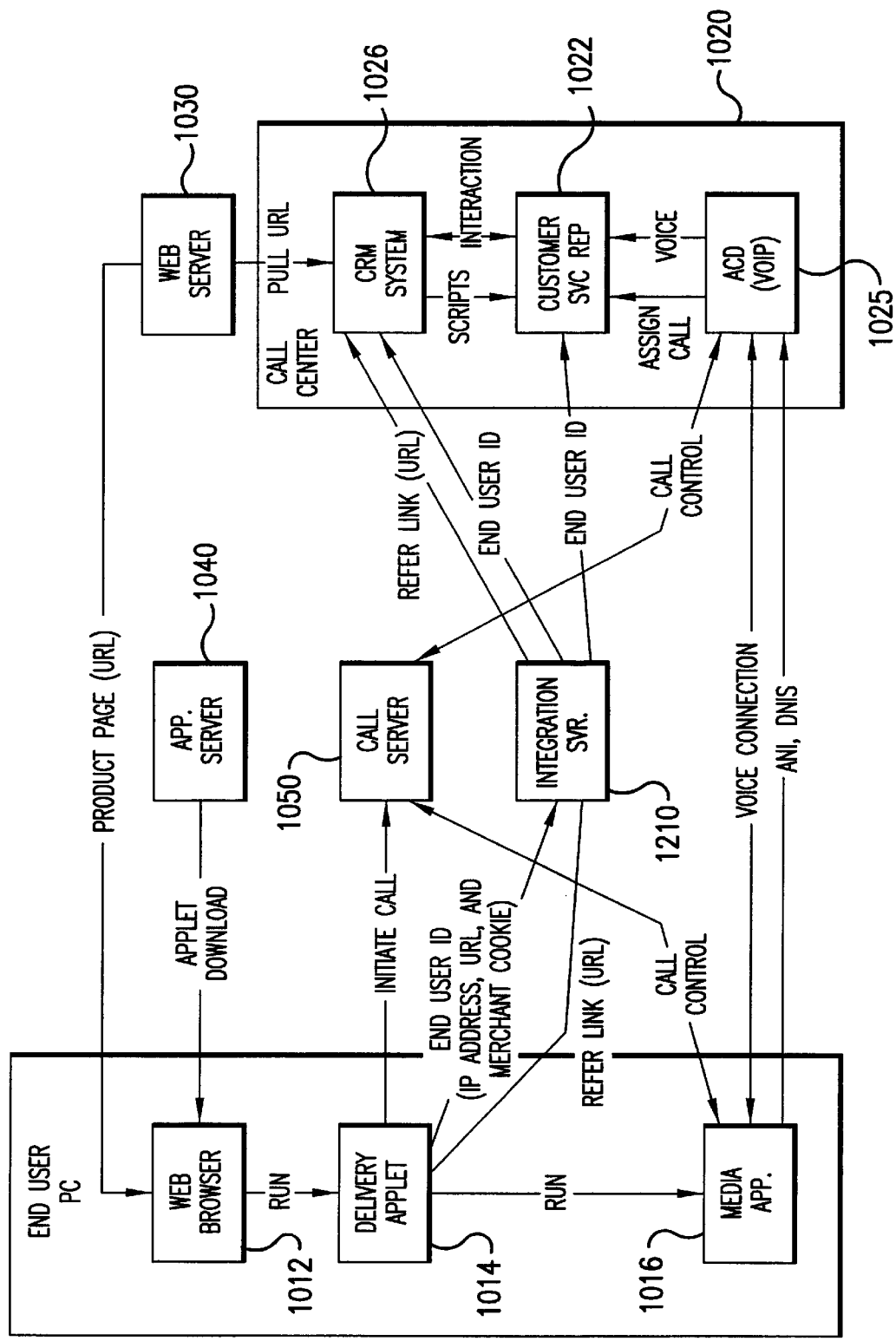
FIG. 13 is a block diagram of a system for establishing a phone call between two computers over a data packet network according to an embodiment of the invention.

Although the embodiments discussed above in connection with FIGS. 10–12 involve Internet to PC telephony, "pure" internet telephony (PC-to-PC) embodiments are also possible. For example, the embodiment of FIG. 12 is easily modified to handle pure internet telephony as shown in FIG. 13. In this embodiment, the call server 1050 sets up the "call" between the media application 1016 and a internet VOIP ACD 1025 at the call center 1020. Voice packets are exchanged directly between the VOIP ACD 1025 and the media application 1016. The integration server, which is optional, functions in a manner similar to that described above in connection with FIG. 12, with an pseudo—ANI being supplied by the media application 1016.

Each of the embodiments discussed in connection with FIGS. 10–13 are capable of implementing the other features discussed elsewhere herein. For example, in the embodiment of FIG. 10, the call center customer service rep 1022 can control the display of web pages at the end user PC 1010 using a simple telephone as discussed further below. In one such embodiment, the customer service representative enters a dialpad sequence (e.g., *76). The dialpad sequence is interpreted by the PSTN gateway 1060 as a display command. The PSTN gateway 1060 then passes the dialpad sequence to the call server 1050. The call center 1050 either passes the sequence directly to the delivery applet 1014, or uses the sequence as an index to retrieve a URL which is sent to the delivery applet 1014. The delivery applet 1014 then sends this information (the "76" or the URL) to the web server 1030 in a download ( ) message, which causes the web server 1030 to send the corresponding web page to the end user PC 1010. In those embodiments in which the dialpad sequence is used by the call server 1050 as an index to retrieve a URL, the call server 1050 is required to maintain a table of URLs, which must of course be supplied and updated by the merchant. Thus, it may be preferable to simply pass the dialpad sequence to the merchant server, which itself can use the sequence as an index to determine which page to download. Controlling the end user's display in a pure internet telephony embodiment, such as that of FIG. 13, may be performed in a simpler, more direct manner: the CRM system 1026 sends a display code (not necessarily a dialpad sequence) to the integration server 1210, which passes this code to the delivery applet 1026, which in turn sends it to the web server 1030 causing the web server 1030 to send the information to the end user PC 1012. Of course, more direct routes are also possible, especially where the web server 1030 is in communication with the CRM system 1026.

Figure 14:
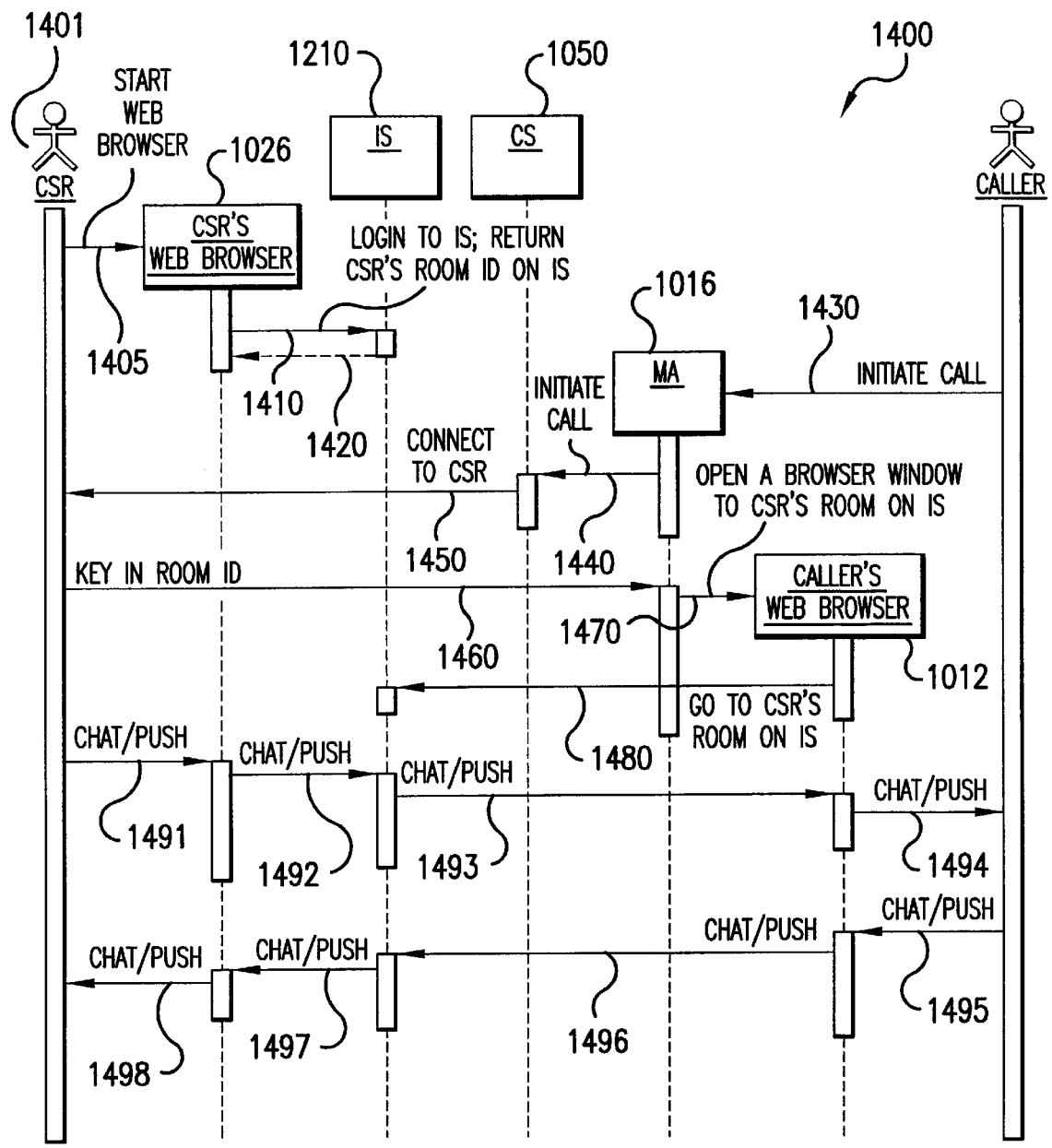
FIG. 14 is a sequence diagram showing steps performed in opening a concurrent data communications channel to an end user of internet telephony services according to an embodiment of the invention.

Yet another strategy for controlling a display of one of the parties to a call or synchronizing displays between parties to a call is illustrated by the sequence diagram 1400 of FIG. 14. In this embodiment, a customer service representative (CSR) 1401 begins each work day by starting a web browser 1026 at step 1405 and logging on to integration server 1210 at step 1410. When the CSR 1401 logs on, the integration server 1210 returns a channel ID, which is preferably a short (e.g., 2–4 digit) numeric code, at step 1420. In preferred embodiments, this code corresponds to one of a number of chatrooms, hosted on the integration server 1210, whose address is known to the CSR 1401. The foregoing preferably occurs before any calls are handled by the CSR 1401.

Next, a caller initiates a call in a manner described previously herein (represented by steps 1430, 1440 and 1450 in FIG. 14). Once the call has been routed (by ACD 1024) to a particular agent, the agent keys in the channel ID using the telephone handset at step 1460, which causes DTMF signals to be transmitted to the media application 1016. The media application recognizes the DTMF signals as a chatroom ID. The media application then appends the digits represented by the signals to a predetermined URL portion (e.g., the predetermined URL portion forms the first part of the URL and the chatroom ID is appended as "/xx" where "xx" is a two digit chatroom ID) to form a chatroom URL and opens a new browser window at step 1470. The newly-opened web browser window goes to the corresponding chatroom at step 1480. The CSR 1401, who also knows the address of the chatroom based on the code they entered, may then send information to the caller through the chatroom on the integration server 1210 at steps 1491–1494, and the caller may send information to the CSR 1401 through the chatroom on the integration server 1210 at steps 1495–1498. This information may comprise standard chat messages, or may include web push information—that is, commands that cause the media application 1016 (or the delivery applet 1014) to request pages corresponding to the commands to be downloaded in the manner described above.

The foregoing technique has several advantages over other techniques. First, the technique requires no changes to existing call centers (unlike the embodiment described above, wherein the call center must be modified to recognize the PSTN gateway ANI and perform special processing in response thereto). Second, the method is more reliable than methods that rely on the ANI because ANI numbers are sometimes lost when a call crosses phone network boundaries. It should also be recognized that the foregoing technique is not limited to exchanging chatroom messages and/or facilitating web pushes. Any kind of information may be exchanged. For example, this technique could be used to set up a channel to allow the media applet 1016 to send cookie information, or other information that identifies the caller, to the CSR 1401.

It is not necessary to utilize a chatroom to facilitate communications between the calling and called parties. As an alternative to such embodiments, in which a chatroom hosted on an intermediate computer is used to synchronize the displays of the calling and called party computers, a direct communications channel such as an SSL socket, could be established between the end user and CSR computers. For example, the DTMF signals (whether detected at the gateway and sent to the end user computer by the gateway through the data packet network or detected at the end user computer itself from decoded voice packets received from the gateway) could form a portion of a URL for a computer associated with the customer service representative to which a socket request is sent. In this case, modifications to the customer call center may be necessary to make the association between the DTMF code entered by the CSR and the URL. One simple way this can be achieved is by permanently assigning each CSR computer to one of the channels corresponding to the DTMF code. The CSR, upon receiving a call, simply enters the DTMF code associated with the computer he or she is using. Upon detection/receipt of the DTMF code, the end user computer sends a socket request to the URL formed in part by the code, which corresponds to the CSR computer.

In one simple, non-limiting example, a call center has stations (comprising a telephone extension connected to the PSTN and a PC connected to the Internet) for forty CSRs. Each of the CSR PCs is assigned a URL (or internet address) with the same prefix, but ending with an "xx", where the "xx" represents a number from one to forty. One number is assigned to each of the PCs. This number is made known to the CSRs (such as by simply pasting a label with the "xx" number on each monitor). When a call is received, the CSR keys in the "xx" number on the telephone keypad. When the DTMF tones are detected, the end user computer, which has knowledge of the prefix, appends the "xx" code corresponding to the DTMF tones and directs a communication such as a socket request to the URL or Internet address formed by the prefix and "xx" code. It will be readily understood that the foregoing is an extremely simple example and that this technique is not so limited.

It will be appreciated by those of skill in the art that the functions performed by the application server 1040, the call server 1050, the gateway 1060 and the integration server 1210 may be performed by a single physical device as a single process or as one or more separate processes, or may be performed in separate physical devices.

Cellular Wireless Communications

The universal Internet based telephony system 100 can be used to serve calls to and from cell u lar/wireless; subscriber stations CS1–CSn (collectively termed "mobile subscriber stations" herein to reflect the fact that these stations are not tethered via wires to the telephone switching network). In particular, the mobile subscriber station CS1 can be used by the customer to initiate an IP telephony call to a called party located at a customer terminal device T1 as described above with respect to FIG. 8. In this case, the mobile subscriber station CS1 is connected via wireless communication system 102 and Inter-Exchange Carrier system 104 to the PSTN Gateway 100B, in a manner that is analogous to the telephone station set SS1 being connected to the PSTN Gateway 100B via Local Exchange Carrier system LEC2 and the Inter-Exchange Carrier system 104. Similarly, IP telephony calls originated by a calling party located at the customer terminal device T1 can be initiated to a called party located at mobile subscriber station CS1 in a manner that corresponds to that described with regard to FIG. 7.

Implementation Architecture

The architecture of the universal Internet based telephony system 100 is a distributed object architecture which makes the execution location of an application subsystem transparent to the application, because multiple objects form a single executing application divided as necessary between computing platforms. Thus, distributed object computing extends an object-oriented programming system by allowing objects to be distributed across a heterogeneous network, so that each of these distributed object components interoperate as a unified whole. These objects may be distributed on different computers throughout a network, living within their own address space outside of an application, and yet appear as though they were local to an application. Thus, a centralized object broker interconnects each IP telephony object with other telephony objects, which are located either locally or remotely. Each object has an interface and exposes a set of methods. A client device can make method calls on an object reference as if the server object resided in the client's address space. The object request broker is responsible for finding an object's implementation, preparing it to receive requests, communicate requests to it and carry the reply back to the client device. Thus, diverse operating system platforms can intercommunicate.

As an example, a client makes a call to the client proxy and the client side proxy packs the call parameters into a request message and invokes a wire protocol to ship the message to the server. At the server side, the wire protocol delivers the message to the server side stub. The server side stub then unpacks the message and calls the actual method on the object. The client stub is referred to as proxy and the server stub is referred to as stub. The telephony protocol stack resident in server side telephony application process 111 can be implemented using the SIP protocol which is an IETF standard protocol for IP communication, for enabling IP telephony gateways, client endpoints, private branch exchanges, and other communication systems or devices to communicate with each other. The SIP protocol mainly addresses the call setup and tear down mechanisms of sessions and is independent of the transmission of media streams between the calling and called parties.

Dynamic Streaming Lossless Compression

The universal Internet based telephony system 100 uses a CODEC that performs real time on the fly compression and decompression for voice over IP telephony applications. In some embodiments, 32 bit lossless voice compression converts 64KB PCM to 16KB and back again to 64KB PCM uses bit streaming. In the universal Internet based telephony system 100, the client side telephony executable process 115 and the server side telephony process 111 cooperate in selecting the size of the buffer that is allocated to compression. The universal Internet based telephony system 100 can automatically modify the compression rate on the fly or the user can select a compression rate.

Additional Services

There are many services to be offered over the Internet telephony connection provided by the universal Internet based telephony system 100, these are just a few:

Calling Cards—A full suite of enhanced feature calling cards can be used, including some with voice over Internet technology.

Fax over IP Corporate—A special service custom tailored for small and medium sized business to enable companies to take advantage of cost reductions associated with Internet technology for their fax to fax communications.

Fax over IP Broadcasting—Immediate fax over IP broadcast marketing services.

IP Telephony Long Distance cards—Pre-paid IP telephony cards over the net allow any user, at any time to dial from any phone into the network with their customer ID and place calls to anywhere in the developed world across the IP telephony network of the universal Internet based telephony system 100.

800 Follow Me Service—The one virtual telephone number of the universal Internet based telephony system 100 enables a calling party to locate the customer, regardless of their location.

1+ Inbound Service-You are able to take advantage of the latest communication technologies without dialing extra digits.

800 Inbound-Customers are able to have an 800 number routed to any number worldwide, through pre-existing PSTN to IP network interfaces.

Audio and Video Conferencing—This new marriage of IP to PSTN brings in the generation of the IP video board meeting. Anyone, anywhere with a computer is able to remotely attend shareholders meetings, conferences and training seminars with significant travel savings and salient convenience.

Sales of Banner Ad's on this Portal Site—Advertising revenue generated from this high traffic portal site can be in the millions. The possibilities for services to provide over IP telephony networks can only be limited by the limitations of the entrepreneur's imagination.

Remote Control of Acoustic Echo Suppression for Internet Telephony

In Internet telephony applications, the microphone and speakers of the customer terminal device T1 function as a telephone handset. If there is no headset on the customer terminal device T1, just speakers, the audio output of the speakers can be picked up by the microphone, creating an acoustic echo. This acoustic echo is transmitted to the party at the other end of the communication connection as a delayed echo of their voice. The acoustic echo is not heard by the customer at their customer terminal device T1 and the customer is therefore unaware of the presence and severity of the acoustic echo. The acoustic echo makes it difficult to conduct a normal conversation and degrades the value of voice over Internet protocol applications that rely on multimedia PCs.

Acoustic echo can be corrected in two ways: by echo suppression (which disables the microphone when voice is being delivered through the speakers), or by echo cancellation (in which signal processing software "subtracts" the sound picked up from the speakers from the sound relayed from the microphone to the listener). Either method of correcting acoustic echo has shortcomings. Echo suppression methods typically create a half duplex connection, in which only one party can speak at a time. While preferable to the echo, a half duplex connection can seem choppy and is less desirable than a full duplex connection. One the other hand, echo cancellation is processor intensive and is particularly difficult in Internet telephony where both network latency and the acoustic configuration of the connecting PCs are variable.

Use of Tone Signals to Control Acoustic Echo Suppression or Cancellation Features In the case when the customer hearing acoustic echo is using a telephone SS1, cellular telephone CS1, or similar telephony device that is equipped with a touchtone keypad, and an acoustic echo is perceived, the customer may transmit a sequence of tone signals to the Voice over IP gateway 100A through which the call is routed. These tones are generated by use of the keypad of the customer terminal device SS1 and the keypad button pushes are translated into digital commands and inserted into IP packets for transmission to the multimedia customer terminal device T1 at the other end of the connection. (The Voice over IP gateway 100A is programmed to recognize these keypad sequences and translate them into commands; it does not pass on an audible signal as part of the media stream.) The voice over IP application 115 resident on the multimedia customer terminal device T1 responds to the digital commands by turning on its echo suppression or echo cancellation features. For example, the Voice over IP application 115 may enable an echo suppression subroutine that converts the voice connection from full duplex to half duplex. Alternatively, the Voice over IP application 115 may invoke an echo cancellation subroutine that attempts to cancel the acoustic echo by subtracting the sound delivered from the speakers to the microphone of the customer terminal device T1 from the voice stream picked up by the microphone.

Tone signals could also be used to turn off echo suppression or echo cancellation features. For some applications, it may be preferable for echo suppression or echo cancellation to be turned off if it is confirmed that the caller is using a headset.

Computer-based User Controls for Remote Control of Acoustic Echo Suppression or Cancellation Features In the case where a customer experiences an acoustic echo problem and is using a multimedia customer terminal device T2, such as a personal computer or other computing device, to provide their voice connection and an acoustic echo is perceived, the customer may access a set of on-screen controls to adjust the echo suppression or echo cancellation settings of the Voice over IP application 115 on the multimedia customer terminal device T1 at the other end of the connection. Graphically, the control may be buttons, icons, sliders, or other familiar visual devices provided through a graphical user interface. The changes made to the acoustic echo controls are translated into digital parameter settings and conveyed to the multimedia customer terminal device T1 at the other end of the connection within IP packets. The Voice over IP application 115 on the multimedia customer terminal device T1 responds by enabling, disabling, or adjusting its echo suppression or echo cancellation features as outlined in the previous section.

Remotely Controlling the Display of Web Pages Using a Telephone

Companies with call centers 103 may receive Voice over IP calls from customers of their web sites, creating a situation in which it is desirable to interactively "push" web pages out to the remote customer. For call centers 103 that are not equipped to provide agents with multimedia customer terminal devices or to support collaborative browsing applications, the following application enables the call center customer service representative or other user to "push" web pages out to remote customers by using their telephone keypad or an equivalent telephony device.

Controlling Remote Display of Web Pages Uses Dial Pad Sequences

The call center agent can"push" web pages through a browser-resident Voice over IP or other application using dial pad sequences on their telephone CC1 or similar telephony device. To make this process work, the agent is provided with a list of dial page command sequences (e.g., *76, equivalent to pressing the star key and the seven and six digit keys) with corresponding web page URLs, typically in printed form. When the dialpad sequences are dialed by the call center agent on their telephone station set CC1, the sequence is interpreted by the Voice over IP gateway 100A as commands and translated into command sequences embedded within IP packets sent to a web server that would serve up the corresponding web page to the destination multimedia customer terminal device T1 at the far end of the communication connection.

Remotely Controlling Media Settings in Conjunction with Voice Over IP or Multimedia Over IP Communications For some Voice over IP applications, a user's multimedia customer terminal device T1 is used as a telephone terminal device. The quality of sound experienced by the person at the other end of the connection is affected by media control settings on the originating multimedia customerterminal device T1. In many cases, multimedia customer terminal device T1 customers are not aware of these controls or their placement within the operating system of the multimedia customer terminal device T1. The following system allows a person receiving a Voice over IP call, such as a call center agent, to remotely control the media settings on the caller's multimedia customer terminal device T1 functioning as a telephone terminal device.

Remotely Controlling Media Settings Using Computer-displayed Controls

The person experiencing a voice quality problem, if the voice connection is provided through a multimedia customer terminal device T2, may control the media settings on the multimedia customer terminal device T1 through a set of controls that interacts with the Voice over IP application 115 resident on the remote multimedia customer terminal device T1. Examples of the settings that could be manipulated are microphone volume, speaker volume, and multimedia device settings. These controls could be text-based, or may be implemented as graphical devices such as sliders, buttons, or icons. To make this process work, the Voice over IP or multimedia communications application 115 resident on the remote multimedia customer terminal device T1 must include a facility for receiving setting changes embedded within Internet packets. The application would recognize the setting changes and translate them into commands for the media controls within the operating system of the multimedia customer terminal device T1. Various connection methods could be used, such as a browser-resident applet that translates the setting changes into remote procedure calls to the Windows operating system on the multimedia customer terminal device T1.

Remotely Controlling Media Settings Using Telephone Dialpad Sequences

If the customer experiencing a voice quality problem is using a telephone SS1 with a dialpad or other similar device to participate in a Voice over IP call, the customer can remotely change the media control settings on the remote multimedia customer terminal device T1 by transmitting dialtone sequences using the touchtone dialpad. Various dialtone sequences would represent different commands (e.g., *22 could mean increase volume by 20% decibels; *88 could mean reduce volume by 20%).

To make this process work, the Voice over IP gateway 100A must be equipped to recognize the dialtone sequences as commands, convert them to digital commands embedded within IP packets, and pass them through to the multimedia customer terminal device T1 at the other end of the voice connection. Similarly, the Voice over IP application 115 on the multimedia customer terminal device T1 must be prepared to recognize the commands and translate them into remote procedure calls to the multimedia customer terminal device operating system to make changes to the media control settings. Alternatively, in the embodiments of FIGS. 10 and 12, dialtone sequences could be recognized by the gateway, stripped out, and sent to the call server 1050, which in turn could pass a message to the end user PC 1010 to control the media settings.

Displaying Data Correlated to a Customer's Access to Web Pages via Conventional Telephony without a Direct Web-based Connection For some Voice over IP applications in eCommerce, a customer's multimedia customer terminal device T1 is used as telephone terminal device to make contact with a customer call center 103 or contact center. Many call centers 103 are not equipped for Internet telephony and therefore receive these calls using the Public Switched Telephone Network (PSTN), of which local exchange carrier LEC1 is a part. These call centers 103 use sophisticated call management and customer relationship management systems that display key information about the customer's history, buying preferences, and purchasing behavior that depends on customer identifying information (such as account numbers) or the customer's phone numbers (which is often identified by a caller identification feature using the ANI standard employed in the PSTN). One of the perceived shortcomings of Internet telephony when a multimedia customer terminal device T1 is used as a customer's telephone terminal device is that customer information may not be available to the call center 103 or contact centeragent unless the agent is equipped with a PC-based telephone device that can display the same web content the customer is viewing, and/or related customer relationship management data. The present system addresses a way to deliver information about the customer's access to web pages and customer history data, collected through an application resident on the customer's multimedia customer terminal device T1, drawing upon features built into web browsers. The information that can be delivered includes any customer identifying information stored in cookies, as well as web pages the customer is currently accessing or has recently accessed along with the contents of selected web-based forms the customer has completed. All the information can be converged to the call center's customer relationship management system using only ANI caller identification data provided automatically by the Internet-to-PSTN gateway employed to provide Voice over Internet service, which can then be correlated with other information delivered through the Internet to the customer relationship management system.

Providing Customer Data for CRM Purposes Using ANI Information Delivered by Conventional Telephone For a call center 103 that has only a conventional telephonic connection to receive an incoming Voice over IP call delivered via a customer's web browser, the gateway supplied ANI caller identification number is used as a key to tie the call to a particular user session on the web. For example, a customer accessing an airline's web site might "click to call" and establish a connection to a call center agent who uses a mainframe based 3270 terminal or a client/server multimedia customer terminal device without a web browser to book reservations. The ANI caller identification number is associated with the PSTN gateway, not the customer's own telephone. However, the customer information can be supplied through a web server that establishes the correlation between a customer session on the airline's web page, any customer information stored on the customer's multimedia customer terminal device T1 (such as cookies), any information maintained on the airline's or third party web servers, and the phone connection established by the customer using the Voice over IP service.

To make this process work, the Voice over IP service must maintain a database that links each active telephone session, in near real-time, to the originating multimedia customer terminal device T1 as identified by a URL or IP address. A web server linked to this database can upload information from the customer's web browser (including cookies and referring web page). The browser-based information, for example, might identify the multimedia customer terminal device T1 as possibly belonging to a customer with a frequent flyer membership that entitles the customer to a specific class of service. It might also indicate that the customer is currently looking at the airline's special offer for vacation packages in Aruba. This information, along with session history information collected from the airline's own web server, can be posted to database system accessible to the airline's customer relationship management system.

Using a set of application programming interfaces, the airlines' customer relationship management system could determine that the call was originating from a Voice over IP service (by looking up the ANI caller identification number which is linked to the PSTN gateway) and check the Voice over IP service's call posting database to collect the available customer data. This data could be secured by only permitting the airline, for example, to access data from call sessions that were initiated from their own web pages.

This process could be combined with the process described for "pushing" web pages back to the customer browser to simulated a collaborative browsing experience, even though the call center agent may not have direct access to the World Wide Web and is not necessarily even using a browser-based application.

What is claimed is:

1. A method for establishing a phone call between an end user using a computer connected to a data packet network and a called party connected to a public switched telephone network, the method comprising the steps of:
   downloading a call web page to the computer, the call web page including an end user identifier, an identifier of a called party, and an address that may be used to obtain software required to complete a phone call to the called party;
   transmitting a message to the address upon an indication by the end user that the phone call to the called party is desired;
   receiving the software at the computer;
   sending the end user identifier from the computer to the called party; and
   exchanging, under the control of the software, voice packets over the data packet network with a gateway connected through the public switched telephone network to the called party.

2. The method of claim 1, wherein the called party is a call center.

3. The method of claim 2, wherein a plurality of web pages are downloaded and the call web page is downloaded prior to the indication by the end user that the phone call to the call center is desired.

4. The method of claim 2, wherein the call web page further includes a merchant identifier.

5. The method of claim 2, further comprising the steps of:
   receiving a web page identifier from the call center;
   transmitting the web page identifier to a web server from which the web page was downloaded; and
   downloading a new web page corresponding to the web page identifier to the computer.

6. The method of claim 5, wherein the new web page corresponds to a web page displayed at the call center on a computer display associated with a representative at the call center.

7. The method of claim 1, wherein the end user identifier is sent the call center in-band.

8. The method of claim 1, wherein the end user identifier is sent to the call center out-of-band.

9. The method of claim 1, further comprising the step of displaying information corresponding to the end user identifier on a display at the call center.

10. The method of claim 1, further comprising the step of storing a portion of the software on a permanent storage device in the computer.

11. The method of claim 1, further comprising the step of examining a permanent storage device on the computer to determine whether a portion of the software is present, wherein the receiving step is not performed for any portion of the software that is present on the permanent storage device.

12. The method of claim 1, wherein the identifier of the called party includes a telephone number for the called party.

13. A method for facilitating a phone call between an end user using a computer connected to a data packet network and a call center connected to a public switched telephone network from a server, the method comprising the steps of:
   receiving a message from the computer indicating a desire to make a phone call;
   receiving a message from the computer including an identifier of a merchant to which a phone call is desired, the merchant having at least one call center;
   instructing, by a server, a gateway connected to the public switched telephone network and the data packet network to establish a call to the call center over the public switched telephone network;
   receiving at the server a message from a call center computer, the message including a phone line identifier of a particular phone line at the gateway over which the phone call is connected;
   retrieving context information using the phone line identifier; and
   transmitting the context information to the call center computer through the data packet network.

14. The method of claim 13, wherein the message indicating a desire to make a phone call and the message including a merchant identifier are part of the same message.

15. The method of claim 14, wherein the merchant identifier includes a telephone number for the merchant.

16. The method of claim 13 wherein the call center packets are transmitted directly from the gateway to the computer.

17. The method of claim 13, wherein the call center packets are sent from the gateway to a server, are combined at the server to form combined packets, and the combined packets are sent from the server to the computer.

18. The method of claim 13, further comprising the steps of selecting the call center from a plurality of call centers associated with the merchant.

19. The method of claim 18, wherein the call center is selected based on a time of day.

20. The method of claim 18, wherein the call center is selected in order to balance load among the plurality of call centers.

21. The method of claim 18, wherein the call center is selected based on geography.

22. The method of claim 18, wherein the call center nearest to the computer is selected.

23. The method of claim 13, wherein the context information includes a customer identification.

24. The method of claim 13, wherein the context information includes a session identification.

25. The method of claim 13, wherein the context information includes an identification of a web page being viewed at the computer.

26. The method of claim 13, wherein the phone line identifier is an automatic number identification (ANI) associated with the particular phone line at the gateway.

27. The method of claim 13, wherein the phone line identifier is a caller ID associated with the particular phone line at the gateway.

28. The method of claim 13, wherein the context information is transmitted in-band to call center.

29. The method of claim 13, wherein the context information is transmitted out-of-band to a computer associated with the call center.

30. The method of claim 13, further comprising the steps of:

receiving a web page identifier from the call center;

transmitting the web page identifier to the computer for use by the computer to download a web page corresponding to the web page identifier.

31. The method of claim 30, wherein the web page identifier comprises a dual tone multi-frequency signal received over the public switched telephone network.

32. A system for establishing a phone call from an end user viewing a merchant web site and a merchant call center, the system comprising:

a web server, the web server including a web page, the web page including an end user identifier, an address to which a message may be sent to receive software to enable a phone call to a merchant call center and an identifier of a merchant associated with the web page, the software being configured to transmit the end user identifier from a computer on which the software is installed to the call center;

an application server, the application server being responsive to a message received at the address to transmit the software to an end user computer;

a gateway connected to a data packet network and a public switched telephone network;

a call server, the call server being responsive to a message including a merchant identifier from the end user computer to configure the gateway to exchange packets comprising digitized voice information with the end user computer over the data packet network and exchange voice information corresponding to the digitized voice information with a merchant call center associated with the merchant over the public switched telephone network.

33. The method of claim 32, wherein the identifier of the merchant associated with the web page includes a telephone number for the called party.

34. A method for conducting a phone call between an end user using a computer connected to a data packet network and a called party connected to a public switched telephone network, the method comprising the steps of:

downloading a call web page to the computer, the call web page including an identifier of the called party;

establishing a phone call between the end user and the called party via a gateway connected to the data packet network and the public switched telephone network;

transmitting a DTMF tone to the gateway from the called party via the public switched telephone network;

translating the DTMF tone to a uniform resource locator (URL); and downloading a second web page corresponding to the URL to the computer.

35. The method of claim 34, wherein the translating step is performed at the gateway.

36. The method of claim 34, wherein the translating step is performed at by translating the DTMF tone to an index at the gateway and the index is used to retrieve a uniform resource locator by the computer.

37. The method of claim 34, wherein the translating step is performed by translating the DTMF tone to an index at the gateway and the index is used to retrieve a uniform resource locator by a server from which the second web page is downloaded.

* * * * *